(12) United States Patent
Yavid

(10) Patent No.: US 12,123,950 B2
(45) Date of Patent: *Oct. 22, 2024

(54) HYBRID LADAR WITH CO-PLANAR SCANNING AND IMAGING FIELD-OF-VIEW

(71) Applicant: Red Creamery LLC, Massapequa Park, NY (US)

(72) Inventor: Dmitriy Yavid, Stony Brook, NY (US)

(73) Assignee: RED CREAMERY, LLC, Massapequa Park, NY (US)

( * ) Notice: Subject to any disclaimer, the term of this patent is extended or adjusted under 35 U.S.C. 154(b) by 590 days.

This patent is subject to a terminal disclaimer.

(21) Appl. No.: 17/394,596

(22) Filed: Aug. 5, 2021

(65) Prior Publication Data

US 2023/0143755 A1    May 11, 2023

Related U.S. Application Data

(63) Continuation of application No. 16/744,410, filed on Jan. 16, 2020, now Pat. No. 11,156,716, which is a
(Continued)

(51) Int. Cl.
*G01C 3/08*    (2006.01)
*G01S 7/481*    (2006.01)
(Continued)

(52) U.S. Cl.
CPC ............ *G01S 17/89* (2013.01); *G01S 7/4817* (2013.01); *G01S 7/4863* (2013.01); *G01S 7/4865* (2013.01)

(58) Field of Classification Search
CPC ...... G01S 17/89; G01S 7/4817; G01S 7/4863; G01S 7/4865
See application file for complete search history.

(56) References Cited

U.S. PATENT DOCUMENTS

| 3,636,250 A | 1/1972 | Haeff |
| 4,240,746 A | 12/1980 | Courtenay |
(Continued)

FOREIGN PATENT DOCUMENTS

| CN | 1106534 A | 8/1995 |
| CN | 1576123 A | 2/2005 |
(Continued)

OTHER PUBLICATIONS

US 11,068,723 B1, 07/2021, Beijbom (withdrawn)

*Primary Examiner* — Mark Hellner
(74) *Attorney, Agent, or Firm* — Thomas A. O'Rourke; James Bongiorno; O'Rourke IPLaw, PLLC

(57) ABSTRACT

A laser radar includes: a laser, an optical transmission system, a 1-dimensional array of photo-detectors, an optical reception system, and an electronic control system. The laser emits a wavelength of light, and the optical transmission system shapes the light into a beam, and scans the beam along a fan of transmission light paths toward a target. The photo-detectors are capable of time-of-arrival measurements and are sensitive to the wavelength of light. The optical reception system collects the laser light reflected from the target along a fan of reception light paths. The electronic control system synchronizes the scan of the beam with a respective time-of-arrival measurement from each of the photo-detectors, and analyzes the time-of-arrival measurements. The system is configured for all of the transmission light paths and all of the reception light paths to lie in one plane, with all of the reception light paths intersecting with at least one of the transmission light paths.

24 Claims, 13 Drawing Sheets

Related U.S. Application Data continuation of application No. 15/432,105, filed on Feb. 14, 2017, now Pat. No. 10,571,574.

(60) Provisional application No. 62/295,210, filed on Feb. 15, 2016.

(51) Int. Cl.
  *G01S 7/4863* (2020.01)
  *G01S 7/4865* (2020.01)
  *G01S 17/89* (2020.01)

(56) References Cited

U.S. PATENT DOCUMENTS

| | | |
|---|---|---|
| 4,397,549 A | 8/1983 | Morgan |
| 4,627,734 A | 12/1986 | Rioux |
| 4,820,914 A | 4/1989 | Allen |
| 4,862,257 A | 8/1989 | Ulich |
| 4,941,719 A | 7/1990 | Hisada |
| 4,964,721 A | 10/1990 | Ulich |
| 4,967,270 A | 10/1990 | Ulich |
| 5,006,721 A | 4/1991 | Cameron |
| 5,013,917 A | 5/1991 | Ulich |
| 5,091,778 A | 2/1992 | Keeler |
| 5,096,293 A | 3/1992 | Cecchi |
| 5,157,257 A | 10/1992 | Geiger |
| 5,159,225 A | 10/1992 | Um |
| 5,164,784 A | 11/1992 | Waggoner |
| 5,164,823 A | 11/1992 | Keeler |
| 5,166,507 A | 11/1992 | Davis |
| 5,192,978 A | 3/1993 | Keeler |
| 5,198,657 A | 3/1993 | Trost |
| 5,200,606 A | 4/1993 | Krasutsky |
| 5,206,698 A | 4/1993 | Werner |
| 5,220,164 A | 6/1993 | Lieber |
| 5,221,927 A | 6/1993 | Palmer |
| 5,221,956 A | 6/1993 | Patterson |
| 5,231,401 A | 7/1993 | Kaman |
| 5,231,480 A | 7/1993 | Ulich |
| 5,233,415 A | 8/1993 | French |
| 5,239,352 A | 8/1993 | Bissonnette |
| 5,241,314 A | 8/1993 | Keeler |
| 5,243,541 A | 9/1993 | Ulich |
| 5,250,810 A | 10/1993 | Geiger |
| 5,255,065 A | 10/1993 | Schwemmer |
| 5,257,085 A | 10/1993 | Ulich |
| 5,270,780 A | 12/1993 | Moran |
| 5,270,929 A | 12/1993 | Paulson |
| 5,272,351 A | 12/1993 | Andressen |
| 5,303,084 A | 4/1994 | Pflibsen |
| 5,311,272 A | 5/1994 | Daniels |
| 5,335,070 A | 8/1994 | Pflibsen |
| 5,343,284 A | 8/1994 | Keeler |
| 5,353,054 A | 10/1994 | Geiger |
| 5,384,589 A | 1/1995 | Ulich |
| 5,442,358 A | 8/1995 | Keeler |
| 5,450,125 A | 9/1995 | Ulich |
| 5,457,639 A | 10/1995 | Ulich |
| 5,467,122 A | 11/1995 | Bowker |
| 5,534,993 A | 7/1996 | Ball |
| 5,546,183 A | 8/1996 | Fegley |
| 5,570,224 A | 10/1996 | Endo |
| 5,574,553 A | 11/1996 | McManamon |
| 5,608,514 A | 3/1997 | Stann |
| 5,644,386 A | 7/1997 | Jenkins |
| 5,667,304 A | 9/1997 | Gelbwachs |
| 5,670,935 A | 9/1997 | Schofield |
| 5,682,225 A | 10/1997 | DuBois |
| 5,724,125 A | 3/1998 | Ames |
| 5,767,519 A | 6/1998 | Gelbwachs |
| 5,778,019 A | 7/1998 | Churnside |
| 5,796,471 A | 8/1998 | Wilkerson |
| 5,822,047 A | 10/1998 | Contarino |
| 5,825,464 A | 10/1998 | Feichtner |
| 5,831,719 A | 11/1998 | Berg |
| 5,831,724 A | 11/1998 | Cordes |
| 5,835,199 A | 11/1998 | Phillips |
| 5,847,815 A | 12/1998 | Albouy |
| 5,847,816 A | 12/1998 | Zediker |
| 5,847,817 A | 12/1998 | Zediker |
| 5,870,180 A * | 2/1999 | Wangler ............ G01S 17/89 |
| | | 368/239 |
| 5,877,851 A | 3/1999 | Stann |
| 5,898,483 A | 4/1999 | Flowers |
| 5,914,776 A | 6/1999 | Streicher |
| 5,989,087 A | 11/1999 | Cordes |
| 6,042,050 A | 3/2000 | Sims |
| 6,084,659 A | 7/2000 | Tulet |
| 6,147,747 A | 11/2000 | Kavaya |
| 6,246,468 B1 | 6/2001 | Dimsdale |
| 6,302,355 B1 | 10/2001 | Sallee |
| 6,323,941 B1 | 11/2001 | Evans |
| 6,371,405 B1 | 4/2002 | Sallee |
| 6,381,007 B2 | 4/2002 | Fabre |
| 6,388,739 B1 | 5/2002 | Rice |
| 6,396,397 B1 | 5/2002 | Bos |
| 6,396,577 B1 | 5/2002 | Ramstack |
| 6,404,494 B1 | 6/2002 | Masonis |
| 6,441,889 B1 | 8/2002 | Patterson |
| 6,448,572 B1 | 9/2002 | Tennant |
| 6,522,396 B1 | 2/2003 | Halmos |
| 6,556,282 B2 | 4/2003 | Jamieson |
| 6,559,932 B1 | 5/2003 | Halmos |
| 6,577,417 B1 | 6/2003 | Khoury |
| 6,593,582 B2 | 7/2003 | Lee |
| 6,608,669 B2 | 8/2003 | Holton |
| 6,608,677 B1 | 8/2003 | Ray |
| 6,618,125 B2 | 9/2003 | Stann |
| 6,619,406 B1 | 9/2003 | Kacyra |
| 6,634,600 B2 | 10/2003 | Krawczyk |
| 6,636,300 B2 | 10/2003 | Doemens |
| 6,646,725 B1 | 11/2003 | Eichinger |
| 6,664,529 B2 | 12/2003 | Pack |
| 6,711,475 B2 | 2/2004 | Murphy |
| 6,714,286 B1 | 3/2004 | Wheel |
| 6,717,655 B2 | 4/2004 | Cheng |
| 6,724,470 B2 | 4/2004 | Barenz |
| 6,781,683 B2 | 8/2004 | Kacyra |
| 6,836,285 B1 | 12/2004 | Lubard |
| 6,844,924 B2 | 1/2005 | Ruff |
| 6,873,716 B1 | 3/2005 | Bowker |
| 6,875,978 B2 | 4/2005 | Halmos |
| 6,882,409 B1 | 4/2005 | Evans |
| 6,963,354 B1 | 11/2005 | Scheps |
| 7,010,339 B2 | 3/2006 | Mullen |
| 7,046,358 B2 | 5/2006 | Barker |
| 7,064,810 B2 | 6/2006 | Anderson |
| 7,064,817 B1 | 6/2006 | Schmitt |
| 7,067,812 B2 | 6/2006 | Gelbwachs |
| 7,104,453 B1 | 9/2006 | Zhu |
| 7,130,028 B2 | 10/2006 | Pain |
| 7,135,672 B2 | 11/2006 | Land |
| 7,164,468 B2 | 1/2007 | Correia Da Silva Vilar |
| 7,164,787 B1 | 1/2007 | Nevis |
| 7,164,788 B1 | 1/2007 | Nevis |
| 7,187,452 B2 | 3/2007 | Jupp |
| 7,190,854 B1 | 3/2007 | Novotny |
| 7,195,163 B2 | 3/2007 | Yoo |
| 7,203,339 B1 | 4/2007 | Nevis |
| 7,206,062 B2 | 4/2007 | Asbrock |
| 7,215,826 B1 | 5/2007 | Nevis |
| 7,227,625 B2 | 6/2007 | Kobayashi |
| 7,242,460 B2 | 7/2007 | Hsu |
| 7,248,342 B1 | 7/2007 | Degnan |
| 7,248,343 B2 | 7/2007 | Cardero |
| 7,260,507 B2 | 8/2007 | Kalayeh |
| 7,274,448 B2 | 9/2007 | Babbin |
| 7,281,891 B2 | 10/2007 | Smith |
| 7,301,608 B1 | 11/2007 | Mendenhall |
| 7,312,855 B1 | 12/2007 | Hintz |
| 7,313,506 B2 | 12/2007 | Kacyra |
| 7,333,184 B2 | 2/2008 | Kalayeh |
| 7,336,345 B2 | 2/2008 | Krasutsky |
| 7,339,670 B2 | 3/2008 | Carrig |

(56) References Cited

U.S. PATENT DOCUMENTS

| | | |
|---|---|---|
| 7,345,744 B2 | 3/2008 | Halmos |
| 7,359,039 B2 | 4/2008 | Kloza |
| 7,361,922 B2 | 4/2008 | Kameyama |
| 7,375,804 B2 | 5/2008 | Liebman |
| 7,375,877 B1 | 5/2008 | Di Teodoro |
| 7,397,568 B2 | 7/2008 | Bryce |
| 7,400,384 B1 | 7/2008 | Evans |
| 7,411,196 B2 | 8/2008 | Kalayeh |
| 7,411,662 B1 | 8/2008 | Ruff |
| 7,417,717 B2 | 8/2008 | Pack |
| 7,428,041 B2 | 9/2008 | Kallio |
| 7,436,494 B1 | 10/2008 | Kennedy |
| 7,440,084 B2 | 10/2008 | Kane |
| 7,463,340 B2 | 12/2008 | Krishnaswamy |
| 7,463,341 B2 | 12/2008 | Halldorsson |
| 7,474,332 B2 | 1/2009 | Byren |
| 7,474,964 B1 | 1/2009 | Welty |
| 7,485,862 B2 | 2/2009 | Danziger |
| 7,495,764 B1 | 2/2009 | McMillan |
| 7,505,488 B2 | 3/2009 | Halmos |
| 7,532,311 B2 | 5/2009 | Henderson |
| 7,561,261 B2 | 7/2009 | Hilde |
| 7,570,347 B2 | 8/2009 | Ruff |
| 7,571,081 B2 | 8/2009 | Faulkner |
| 7,580,127 B1 | 8/2009 | Mayor |
| 7,583,364 B1 | 9/2009 | Mayor |
| 7,630,062 B2 | 12/2009 | Mori |
| 7,649,616 B2 | 1/2010 | Michael |
| 7,652,752 B2 | 1/2010 | Fetzer |
| 7,656,526 B1 | 2/2010 | Spuler |
| 7,675,610 B2 | 3/2010 | Redman |
| 7,675,619 B2 | 3/2010 | Danehy |
| 7,683,928 B2 | 3/2010 | Lubard |
| 7,688,348 B2 | 3/2010 | Lubard |
| 7,688,374 B2 | 3/2010 | Land |
| 7,692,775 B2 | 4/2010 | Treado |
| 7,697,125 B2 | 4/2010 | Swenson |
| 7,697,794 B2 | 4/2010 | Dragic |
| 7,701,558 B2 | 4/2010 | Walsh |
| 7,720,580 B2 | 5/2010 | Higgins-Luthman |
| 7,720,605 B2 | 5/2010 | Welty |
| 7,739,823 B2 | 6/2010 | Shapira |
| 7,741,618 B2 | 6/2010 | Lee |
| 7,742,151 B2 | 6/2010 | Krasutsky |
| 7,746,450 B2 | 6/2010 | Williner |
| 7,755,745 B2 | 7/2010 | Urata |
| 7,760,334 B1 | 7/2010 | Evans |
| 7,800,736 B2 | 9/2010 | Pack |
| 7,821,619 B2 | 10/2010 | Krikorian |
| 7,827,861 B2 | 11/2010 | La White |
| 7,830,442 B2 | 11/2010 | Griffis |
| 7,847,235 B2 | 12/2010 | Krumpkin |
| 7,894,044 B1 | 2/2011 | Sullivan |
| 7,933,002 B2 | 4/2011 | Halldorsson |
| 7,936,448 B2 | 5/2011 | Albuquerque |
| 7,944,547 B2 | 5/2011 | Wang |
| 7,948,610 B2 | 5/2011 | Hintz |
| 7,961,301 B2 | 6/2011 | Earhart |
| 7,969,558 B2 | 6/2011 | Hall |
| 7,974,813 B2 | 7/2011 | Welty |
| 7,983,738 B2 | 7/2011 | Goldman |
| 7,986,397 B1 | 7/2011 | Tiemann |
| 8,010,300 B1 | 8/2011 | Stearns |
| 8,024,135 B2 | 9/2011 | Lee |
| 8,054,454 B2 | 11/2011 | Treado |
| 8,054,464 B2 | 11/2011 | Mathur |
| 8,072,581 B1 | 12/2011 | Breiholz |
| 8,072,582 B2 | 12/2011 | Meneely |
| 8,072,663 B2 | 12/2011 | O'Neil |
| 8,077,294 B1 | 12/2011 | Grund |
| 8,081,301 B2 | 12/2011 | Stann |
| 8,090,153 B2 | 1/2012 | Schofield |
| 8,098,889 B2 | 1/2012 | Zhu |
| 8,115,622 B2 | 2/2012 | Stolarczyk |
| 8,115,925 B1 | 2/2012 | Mathur |
| 8,120,754 B2 | 2/2012 | Kaehler |
| 8,121,798 B2 | 2/2012 | Lippert |
| 8,125,367 B2 | 2/2012 | Ludwig |
| 8,125,622 B2 | 2/2012 | Gammenthaler |
| 8,135,513 B2 | 3/2012 | Bauer |
| 8,139,863 B1 | 3/2012 | Hsu |
| 8,164,742 B2 | 4/2012 | Carrieri |
| 8,179,521 B2 | 5/2012 | Valla |
| 8,198,576 B2 | 6/2012 | Kennedy |
| 8,224,097 B2 | 7/2012 | Matei |
| 8,229,663 B2 | 7/2012 | Zeng |
| 8,229,679 B1 | 7/2012 | Matthews |
| 8,242,428 B2 | 8/2012 | Meyers |
| 8,244,026 B2 | 8/2012 | Nahari |
| 8,269,950 B2 | 9/2012 | Spinelli |
| RE43,722 E | 10/2012 | Kennedy |
| 8,279,420 B2 | 10/2012 | Ludwig |
| 8,284,382 B2 | 10/2012 | Krasutsky |
| 8,294,881 B2 | 10/2012 | Hellickson |
| 8,306,273 B1 | 11/2012 | Gravseth |
| 8,306,941 B2 | 11/2012 | Ma |
| 8,325,328 B2 | 12/2012 | Renard |
| 8,332,134 B2 | 12/2012 | Zhang |
| 8,344,942 B2 | 1/2013 | Jin |
| 8,362,889 B2 | 1/2013 | Komori |
| 8,386,876 B2 | 2/2013 | Khoshnevis |
| 8,427,649 B2 | 4/2013 | Hays |
| 8,441,622 B2 | 5/2013 | Gammenthaler |
| 8,446,571 B2 | 5/2013 | Fiess |
| 8,465,478 B2 | 6/2013 | Frey |
| 8,478,386 B2 | 7/2013 | Goldman |
| 8,493,445 B2 | 7/2013 | Degnan |
| 8,494,687 B2 | 7/2013 | Vanek |
| 8,508,721 B2 | 8/2013 | Cates |
| 8,537,337 B2 | 9/2013 | Welty |
| 8,537,338 B1 | 9/2013 | Medasani |
| 8,538,695 B2 | 9/2013 | Welty |
| 8,541,744 B1 | 9/2013 | Liu |
| 8,558,993 B2 | 10/2013 | Newbury |
| 8,577,611 B2 | 11/2013 | Ma |
| 8,587,637 B1 | 11/2013 | Cryder |
| 8,599,365 B2 | 12/2013 | Ma |
| 8,599,367 B2 | 12/2013 | Canham |
| 8,600,589 B2 | 12/2013 | Mendez-Rodriguez |
| 8,605,262 B2 | 12/2013 | Campbell |
| 8,610,881 B2 | 12/2013 | Gammenthaler |
| 8,629,975 B1 | 1/2014 | Dierking |
| 8,629,977 B2 | 1/2014 | Phillips |
| 8,648,702 B2 | 2/2014 | Pala |
| 8,655,513 B2 | 2/2014 | Vanek |
| 8,659,747 B2 | 2/2014 | Goodman |
| 8,659,748 B2 | 2/2014 | Fakin |
| 8,670,591 B2 | 3/2014 | Mendez-Rodriguez |
| 8,675,181 B2 | 3/2014 | Hall |
| 8,675,184 B2 | 3/2014 | Schmitt |
| 8,692,980 B2 | 4/2014 | Gilliland |
| 8,692,983 B1 | 4/2014 | Chapman |
| 8,712,147 B2 | 4/2014 | Rahmes |
| 8,717,545 B2 | 5/2014 | Sebastian |
| 8,724,099 B2 | 5/2014 | Asahara |
| 8,736,818 B2 | 5/2014 | Weimer |
| 8,767,187 B2 | 7/2014 | Coda |
| 8,767,190 B2 | 7/2014 | Hall |
| 8,775,081 B2 | 7/2014 | Welty |
| 8,781,790 B2 | 7/2014 | Zhu |
| 8,786,835 B1 | 7/2014 | Reardon |
| 8,797,512 B2 | 8/2014 | Stettner |
| 8,798,372 B1 | 8/2014 | Korchev |
| 8,798,841 B1 | 8/2014 | Nickolaou |
| 8,804,101 B2 | 8/2014 | Spagnolia |
| 8,818,124 B1 | 8/2014 | Kia |
| 8,818,722 B2 | 8/2014 | Elgersma |
| 8,829,417 B2 | 9/2014 | Krill |
| 8,836,922 B1 | 9/2014 | Pennecot |
| 8,855,848 B2 | 10/2014 | Zeng |
| 8,855,849 B1 | 10/2014 | Ferguson |
| 8,885,883 B2 | 11/2014 | Goodman |
| 8,891,069 B2 | 11/2014 | Pedersen |
| 8,896,818 B2 | 11/2014 | Walsh |

(56) References Cited

U.S. PATENT DOCUMENTS

| | | |
|---|---|---|
| 8,915,709 B2 | 12/2014 | Westergaard |
| 8,938,362 B2 | 1/2015 | Ionov |
| 8,939,081 B1 | 1/2015 | Smith |
| 8,947,644 B2 | 2/2015 | Halmos |
| 8,947,647 B2 | 2/2015 | Halmos |
| 8,958,057 B2 | 2/2015 | Kane |
| 8,976,339 B2 | 3/2015 | Phillips |
| 8,976,340 B2 | 3/2015 | Gilliland |
| 8,976,342 B2 | 3/2015 | Lacondemine |
| 9,002,511 B1 | 4/2015 | Hickerson |
| 9,007,569 B2 | 4/2015 | AmZajerdian |
| 9,007,570 B1 | 4/2015 | Beyon |
| 9,041,915 B2 | 5/2015 | Earhart |
| 9,046,600 B2 | 6/2015 | James |
| 9,056,395 B1 | 6/2015 | Ferguson |
| 9,057,605 B2 | 6/2015 | Halmos |
| 9,069,059 B2 | 6/2015 | Vogt |
| 9,069,061 B1 | 6/2015 | Harwit |
| 9,069,080 B2 | 6/2015 | Stettner |
| 9,081,090 B2 | 7/2015 | Sebastian |
| 9,086,275 B2 | 7/2015 | Weinberg |
| 9,086,486 B2 | 7/2015 | Gilliland |
| 9,098,753 B1 | 8/2015 | Zhu |
| 9,103,907 B2 | 8/2015 | Sebastian |
| 9,110,154 B1 | 8/2015 | Bates |
| 9,110,163 B2 | 8/2015 | Rogan |
| 9,110,169 B2 | 8/2015 | Stettner |
| 9,111,444 B2 | 8/2015 | Kaganovich |
| 9,128,185 B2 | 9/2015 | Zeng |
| 9,128,190 B1 | 9/2015 | Ulrich |
| 9,129,211 B2 | 9/2015 | Zeng |
| 9,134,402 B2 | 9/2015 | Sebastian |
| 9,146,102 B2 | 9/2015 | Pernstich |
| 9,146,316 B2 | 9/2015 | Gammenthaler |
| 9,165,383 B1 | 10/2015 | Mendez-Rodriguez |
| 9,170,096 B2 | 10/2015 | Fowler |
| 9,188,674 B2 | 11/2015 | Suzuki |
| 9,188,677 B2 | 11/2015 | Bossert |
| 9,201,146 B2 | 12/2015 | Beyon |
| 9,215,382 B1 | 12/2015 | Hilde |
| 9,223,025 B2 | 12/2015 | Debrunner |
| 9,229,108 B2 | 1/2016 | Debrunner |
| 9,229,109 B2 | 1/2016 | Stettner |
| 9,244,272 B2 | 1/2016 | Schiltz |
| 9,255,989 B2 | 2/2016 | Joshi |
| 9,277,204 B2 | 3/2016 | Gilliland |
| 9,285,464 B2 | 3/2016 | Pennecot |
| 9,300,321 B2 | 3/2016 | Zalik |
| 9,310,471 B2 | 4/2016 | Sayyah |
| 9,310,487 B2 | 4/2016 | Sakimura |
| 9,315,192 B1 | 4/2016 | Zhu |
| 9,335,414 B2 | 5/2016 | Leyva |
| 9,354,317 B2 | 5/2016 | Halmos |
| 9,354,825 B2 | 5/2016 | Kozak |
| 9,360,554 B2 | 6/2016 | Retterath |
| 9,360,555 B2 | 6/2016 | Oh |
| 9,361,412 B1 | 6/2016 | Hilde |
| 9,366,938 B1 | 6/2016 | Anderson |
| 9,369,689 B1 | 6/2016 | Tran |
| 9,378,463 B2 | 6/2016 | Zeng |
| 9,383,447 B2 | 7/2016 | Schmitt |
| 9,383,753 B1 | 7/2016 | Templeton |
| 9,407,285 B2 | 8/2016 | Kozak |
| 9,420,177 B2 | 8/2016 | Pettegrew |
| 9,420,264 B2 | 8/2016 | Gilliland |
| 9,425,654 B2 | 8/2016 | Lenius |
| 9,448,110 B2 | 9/2016 | Wong |
| 9,453,907 B2 | 9/2016 | Zheleznyak |
| 9,453,914 B2 | 9/2016 | Stettner |
| 9,453,941 B2 | 9/2016 | Stainvas Olshansky |
| 9,465,112 B2 | 10/2016 | Stettner |
| 9,470,520 B2 | 10/2016 | Schwarz |
| 9,476,968 B2 | 10/2016 | Anderson |
| 9,476,983 B2 | 10/2016 | Zeng |
| 9,489,746 B2 | 11/2016 | Sebastian |
| 9,495,466 B2 | 11/2016 | Geringer |
| 9,519,979 B1 | 12/2016 | Hilde |
| 9,523,772 B2 | 12/2016 | Rogan |
| 9,525,863 B2 | 12/2016 | Nawasara |
| 9,529,087 B2 | 12/2016 | Stainvas Olshansky |
| 9,530,062 B2 | 12/2016 | Nguyen |
| 9,547,074 B2 | 1/2017 | Schulz |
| 9,575,162 B2 | 2/2017 | Owechko |
| 9,575,164 B2 | 2/2017 | Kim |
| 9,575,184 B2 | 2/2017 | Gilliland |
| 9,575,341 B2 | 2/2017 | Heck |
| 9,588,220 B2 | 3/2017 | Rondeau |
| 9,599,468 B2 | 3/2017 | Walsh |
| 9,599,714 B2 | 3/2017 | Imaki |
| 9,602,224 B1 | 3/2017 | McLaughlin |
| 9,606,236 B2 | 3/2017 | Rojas |
| 9,625,580 B2 | 4/2017 | Kotelnikov |
| 9,625,582 B2 | 4/2017 | Gruver |
| 9,651,658 B2 | 5/2017 | Pennecot |
| 9,658,322 B2 | 5/2017 | Lewis |
| 9,658,337 B2 | 5/2017 | Ray |
| 9,678,199 B2 | 6/2017 | Hutson |
| 9,702,975 B2 | 7/2017 | Brinkmeyer |
| 9,710,714 B2 | 7/2017 | Chen |
| 9,735,885 B1 | 8/2017 | Sayyah |
| 9,753,124 B2 | 9/2017 | Hayes |
| 9,753,462 B2 | 9/2017 | Gilliland |
| 9,759,809 B2 | 9/2017 | Derenick |
| 9,772,399 B2 | 9/2017 | Schwarz |
| 9,778,362 B2 | 10/2017 | Rondeau |
| 9,784,840 B2 | 10/2017 | Pedersen |
| 9,790,924 B2 | 10/2017 | Bayon |
| 9,791,555 B2 | 10/2017 | Zhu |
| 9,791,557 B1 | 10/2017 | Wyrwas |
| 9,797,995 B2 | 10/2017 | Gilliland |
| 9,804,264 B2 | 10/2017 | Villeneuve |
| 9,810,775 B1 | 11/2017 | Welford |
| 9,810,776 B2 | 11/2017 | Sapir |
| 9,810,777 B2 | 11/2017 | Williams |
| 9,810,786 B1 | 11/2017 | Welford |
| 9,812,838 B2 | 11/2017 | Villeneuve |
| 9,823,118 B2 | 11/2017 | Doylend |
| 9,823,350 B2 | 11/2017 | Fluckiger |
| 9,823,351 B2 | 11/2017 | Haslim |
| 9,823,353 B2 | 11/2017 | Eichenholz |
| 9,830,509 B2 | 11/2017 | Zang |
| 9,831,630 B2 | 11/2017 | Lipson |
| 9,834,209 B2 | 12/2017 | Stettner |
| 9,841,495 B2 | 12/2017 | Campbell |
| 9,851,433 B2 | 12/2017 | Sebastian |
| 9,851,442 B1 | 12/2017 | Lo |
| RE46,672 E | 1/2018 | Hall |
| 9,857,473 B2 | 1/2018 | Kim |
| 9,860,770 B1 | 1/2018 | McLaughlin |
| 9,869,753 B2 | 1/2018 | Eldada |
| 9,869,754 B1 | 1/2018 | Campbell |
| 9,870,512 B2 | 1/2018 | Rogan |
| 9,872,010 B2 | 1/2018 | Tran |
| 9,874,635 B1 | 1/2018 | Eichenholz |
| 9,877,009 B2 | 1/2018 | Tran |
| 9,880,263 B2 | 1/2018 | Droz |
| 9,880,281 B2 | 1/2018 | Gilliland |
| 9,881,220 B2 | 1/2018 | Koravadi |
| 9,882,433 B2 | 1/2018 | Lenius |
| 9,885,778 B2 | 2/2018 | Dussan |
| 9,891,711 B1 | 2/2018 | Lee |
| 9,892,567 B2 | 2/2018 | Binion |
| 9,897,687 B1 | 2/2018 | Campbell |
| 9,897,689 B2 | 2/2018 | Dussan |
| 9,904,375 B1 | 2/2018 | Donnelly |
| 9,905,032 B2 | 2/2018 | Rogan |
| 9,905,987 B2 | 2/2018 | Seo |
| 9,905,992 B1 | 2/2018 | Welford |
| 9,910,136 B2 | 3/2018 | Heo |
| 9,910,139 B2 | 3/2018 | Pennecot |
| 9,910,155 B2 | 3/2018 | Lundquist |
| 9,915,726 B2 | 3/2018 | Bailey |
| 9,921,297 B2 | 3/2018 | Jungwirth |
| 9,921,307 B2 | 3/2018 | Schmalengurg |

(56) References Cited

U.S. PATENT DOCUMENTS

| | | |
|---|---|---|
| 9,927,524 B2 | 3/2018 | Kaiser |
| 9,933,513 B2 | 4/2018 | Dussan |
| 9,933,514 B1 | 4/2018 | Gylys |
| 9,945,950 B2 | 4/2018 | Newman |
| 9,958,545 B2 | 5/2018 | Eichenholz |
| 9,971,024 B2 | 5/2018 | Schwarz |
| 9,971,035 B2 | 5/2018 | Imaki |
| 9,983,297 B2 | 5/2018 | Hall |
| 9,983,590 B2 | 5/2018 | Templeton |
| 9,985,071 B2 | 5/2018 | Irish |
| 9,989,969 B2 | 6/2018 | Eustice |
| 10,000,000 B2 | 6/2018 | Marron |
| 10,012,474 B2 | 7/2018 | Teetzel |
| 10,012,723 B2 | 7/2018 | Lindskog |
| 10,012,732 B2 | 7/2018 | Eichenholz |
| 10,018,711 B1 | 7/2018 | Sebastian |
| 10,018,725 B2 | 7/2018 | Liu |
| 10,018,726 B2 | 7/2018 | Hall |
| 10,019,803 B2 | 7/2018 | Venable |
| 10,024,964 B2 | 7/2018 | Pierce |
| 10,031,214 B2 | 7/2018 | Rosenweig |
| 10,031,231 B2 | 7/2018 | Zermas |
| 10,031,232 B2 | 7/2018 | Zohar |
| 10,032,369 B2 | 7/2018 | Koravadi |
| 10,036,801 B2 | 7/2018 | Reterrath |
| 10,036,803 B2 | 7/2018 | Pacala |
| D826,746 S | 8/2018 | Qiu |
| 10,042,042 B2 | 8/2018 | Miremadi |
| 10,042,043 B2 | 8/2018 | Dussan |
| 10,042,159 B2 | 8/2018 | Dussan |
| 10,046,187 B2 | 8/2018 | Doten |
| 10,048,359 B2 | 8/2018 | Zhelenyzak |
| 10,048,374 B2 | 8/2018 | Hall |
| 10,054,841 B2 | 8/2018 | Nomura |
| 10,061,019 B1 | 8/2018 | Campbell |
| 10,061,020 B1 | 8/2018 | Slobodyanyuk |
| 10,061,266 B2 | 9/2018 | Christmas |
| 10,067,230 B2 | 9/2018 | Smits |
| 10,073,166 B2 | 9/2018 | Dussan |
| 10,078,133 B2 | 9/2018 | Dussan |
| 10,078,137 B2 | 9/2018 | Ludwig |
| 10,088,557 B2 | 10/2018 | Yeun |
| 10,088,558 B2 | 10/2018 | Dussan |
| 10,094,657 B2 | 10/2018 | Kiss |
| 10,094,916 B1 | 10/2018 | Droz |
| 10,094,925 B1 | 10/2018 | LaChapelle |
| 10,094,928 B2 | 10/2018 | Josset |
| 10,107,914 B2 | 10/2018 | Kalscheur |
| 10,107,915 B2 | 10/2018 | Rozenzweig |
| 10,109,208 B2 | 10/2018 | Cherepinsky |
| 10,114,109 B2 | 10/2018 | Gazit |
| 10,114,112 B2 | 10/2018 | Slobodyanyuk |
| 10,115,024 B2 | 10/2018 | Stein |
| 10,120,076 B2 | 11/2018 | Scheim |
| 10,121,813 B2 | 11/2018 | Eichenholz |
| 10,126,411 B2 | 11/2018 | Gilliland |
| 10,126,412 B2 | 11/2018 | Eldada |
| 10,131,446 B1 | 11/2018 | Stambler |
| 10,132,928 B2 | 11/2018 | Eldada |
| 10,139,478 B2 | 11/2018 | Gaalema |
| 10,142,538 B2 | 11/2018 | Hurd |
| 10,145,941 B2 | 12/2018 | Lee |
| 10,145,944 B1 | 12/2018 | Shchemelinin |
| 10,145,945 B2 | 12/2018 | Harada |
| 10,148,060 B2 | 12/2018 | Hong |
| 10,151,836 B2 | 12/2018 | O'Keeffe |
| 10,168,423 B2 | 1/2019 | Lombrozo |
| 10,168,429 B2 | 1/2019 | Maleki |
| 10,175,344 B2 | 1/2019 | Jungwirth |
| 10,175,361 B2 | 1/2019 | Haines |
| 10,180,493 B2 | 1/2019 | Eldada |
| 10,185,027 B2 | 1/2019 | O'Keeffe |
| 10,185,028 B2 | 1/2019 | Dussan |
| 10,185,033 B2 | 1/2019 | Justice |
| 10,191,156 B2 | 1/2019 | Steinberg |
| 10,197,669 B2 | 2/2019 | Hall |
| 10,197,676 B2 | 2/2019 | Slobodyyanyuk |
| 10,197,765 B2 | 2/2019 | Schulz |
| 10,203,399 B2 | 2/2019 | Retterath |
| 10,203,401 B2 | 2/2019 | Sebastian |
| 10,209,349 B2 | 2/2019 | Dussan |
| 10,209,359 B2 | 2/2019 | Russell |
| 10,209,709 B2 | 2/2019 | Peters |
| 10,214,299 B2 | 2/2019 | Jackowski |
| 10,215,846 B2 | 2/2019 | Carothers |
| 10,215,847 B2 | 2/2019 | Scheim |
| 10,215,848 B2 | 2/2019 | Dussan |
| 10,215,859 B2 | 2/2019 | Steinberg |
| 10,222,474 B1 | 3/2019 | Raring |
| 10,222,477 B2 | 3/2019 | Keilaf |
| 10,223,806 B1 | 3/2019 | Luo |
| 10,223,807 B1 | 3/2019 | Luo |
| 10,241,196 B2 | 3/2019 | Bailey |
| 10,241,198 B2 | 3/2019 | LaChappelle |
| 10,247,811 B2 | 4/2019 | Clifton |
| 10,254,402 B2 | 4/2019 | Lane |
| 10,254,405 B2 | 4/2019 | Campbell |
| 10,261,006 B2 | 4/2019 | Ray |
| 10,261,187 B2 | 4/2019 | Halmos |
| 10,262,234 B2 | 4/2019 | Li |
| 10,267,898 B2 | 4/2019 | Campbell |
| 10,267,918 B2 | 4/2019 | LaChapelle |
| 10,274,377 B1 | 4/2019 | Rabb |
| 10,274,599 B2 | 4/2019 | Schmalenberg |
| D849,573 S | 5/2019 | Haban |
| 10,281,254 B2 | 5/2019 | Ginsberg |
| 10,281,322 B2 | 5/2019 | Doyland |
| 10,281,564 B2 | 5/2019 | Low |
| 10,281,581 B2 | 5/2019 | Lipson |
| 10,281,582 B2 | 5/2019 | Elooz |
| 10,288,736 B2 | 5/2019 | Lipson |
| 10,288,737 B2 | 5/2019 | Mooney |
| 10,295,656 B1 | 5/2019 | Li |
| 10,295,660 B1 | 5/2019 | McMichael |
| 10,295,668 B2 | 5/2019 | LaChapelle |
| 10,295,670 B2 | 5/2019 | Stettner |
| 10,295,671 B2 | 5/2019 | Grazit |
| 10,295,672 B2 | 5/2019 | Abari |
| 10,295,673 B1 | 5/2019 | Tucker |
| 10,302,746 B2 | 5/2019 | O'Keeffee |
| 10,302,749 B2 | 5/2019 | Droz |
| D850,306 S | 6/2019 | Bainter |
| 10,310,058 B1 | 6/2019 | Campbell |
| 10,310,087 B2 | 6/2019 | Laddha |
| 10,317,529 B2 | 6/2019 | Shy |
| 10,317,533 B2 | 6/2019 | Cherepinsky |
| 10,324,170 B1 | 6/2019 | Enberg |
| 10,324,185 B2 | 6/2019 | McWhirter |
| 10,330,777 B2 | 6/2019 | Popovich |
| 10,330,778 B2 | 6/2019 | Kaneda |
| 10,330,780 B2 | 6/2019 | Hall |
| 10,331,956 B2 | 6/2019 | Solar |
| 10,353,074 B2 | 6/2019 | Justice |
| 10,337,996 B2 | 7/2019 | Blagojevic |
| 10,338,201 B2 | 7/2019 | Slobodyyanyuk |
| 10,338,202 B2 | 7/2019 | Mashtare |
| 10,338,220 B1 | 7/2019 | Raring |
| 10,338,224 B2 | 7/2019 | Eken |
| 10,338,225 B2 | 7/2019 | Boehmke |
| 10,340,651 B1 | 7/2019 | Drummer |
| 10,345,446 B2 | 7/2019 | Raring |
| 10,345,447 B1 | 7/2019 | Hicks |
| 10,346,695 B2 | 7/2019 | Clifford |
| 10,351,103 B2 | 7/2019 | Yeo |
| 10,353,057 B2 | 7/2019 | Suzuki |
| 10,353,075 B2 | 7/2019 | Buskila |
| 10,359,507 B2 | 7/2019 | Berger |
| 10,366,282 B2 | 7/2019 | Lee |
| 10,372,138 B2 | 8/2019 | Gilliland |
| 10,377,373 B2 | 8/2019 | Stettner |
| 10,379,135 B2 | 8/2019 | Maryfield |
| 10,379,205 B2 | 8/2019 | Dussan |
| 10,379,220 B1 | 8/2019 | Smits |
| 10,379,540 B2 | 8/2019 | Droz |

(56) References Cited

U.S. PATENT DOCUMENTS

| | | | |
|---|---|---|---|
| 10,386,464 | B2 | 8/2019 | Dussan |
| 10,386,465 | B2 | 8/2019 | Hall |
| 10,386,487 | B1 | 8/2019 | Wilton |
| 10,386,488 | B2 | 8/2019 | Ridderbusch |
| 10,393,863 | B2 | 8/2019 | Sun |
| 10,393,877 | B2 | 8/2019 | Hall |
| 10,394,345 | B2 | 8/2019 | Donnelly |
| 10,401,480 | B1 | 9/2019 | Gaalema |
| 10,401,484 | B2 | 9/2019 | Lee |
| 10,401,500 | B2 | 9/2019 | Yang |
| 10,401,866 | B2 | 9/2019 | Rust |
| 10,408,926 | B2 | 9/2019 | Slobodyyabnyuk |
| 10,408,936 | B2 | 9/2019 | Van Voorst |
| 10,408,939 | B1 | 9/2019 | Kim |
| 10,408,940 | B2 | 9/2019 | O'Keeffe |
| 10,416,292 | B2 | 9/2019 | de Mersseman |
| 10,418,776 | B2 | 9/2019 | Welford |
| 10,422,862 | B2 | 9/2019 | Gnecchi |
| 10,422,863 | B2 | 9/2019 | Choi |
| 10,422,865 | B2 | 9/2019 | Irish |
| 10,386,467 | B2 | 10/2019 | Dussan |
| 10,429,243 | B2 | 10/2019 | Yu |
| 10,429,495 | B1 | 10/2019 | Wang |
| 10,429,496 | B2 | 10/2019 | Weinberg |
| 10,429,507 | B2 | 10/2019 | Sebastian |
| 10,429,511 | B2 | 10/2019 | Bosetti |
| 10,430,970 | B2 | 10/2019 | Bier |
| 10,436,882 | B2 | 10/2019 | Meng |
| 10,436,904 | B2 | 10/2019 | Moss |
| 10,436,907 | B1 | 10/2019 | Murray |
| 10,444,330 | B2 | 10/2019 | Stann |
| 10,444,356 | B2 | 10/2019 | Wu |
| 10,444,362 | B2 | 10/2019 | Schaefer |
| 10,444,367 | B2 | 10/2019 | Lodden |
| 10,445,928 | B2 | 10/2019 | Nehmadi |
| 10,447,973 | B2 | 10/2019 | Droz |
| 10,451,716 | B2 | 10/2019 | Hughes |
| 10,451,740 | B2 | 10/2019 | Pei |
| 10,451,742 | B2 | 10/2019 | Christmas |
| 10,458,904 | B2 | 10/2019 | Batholomew |
| 10,466,342 | B1 | 11/2019 | Zhu |
| 10,469,753 | B2 | 11/2019 | Yang |
| 10,473,763 | B2 | 11/2019 | Schwarz |
| 10,473,767 | B2 | 11/2019 | Xiang |
| 10,473,768 | B2 | 11/2019 | Walsh |
| 10,473,770 | B1 | 11/2019 | Zhu |
| 10,473,784 | B2 | 11/2019 | Puglia |
| 10,474,160 | B2 | 11/2019 | Huang |
| 10,474,161 | B2 | 11/2019 | Huang |
| 10,481,267 | B2 | 11/2019 | Wang |
| 10,481,268 | B2 | 11/2019 | Vlaiko |
| 10,482,740 | B2 | 11/2019 | Fang |
| 10,488,495 | B2 | 11/2019 | Sebastian |
| 10,488,496 | B2 | 11/2019 | Campbell |
| 10,488,497 | B2 | 11/2019 | Cheong |
| 10,491,052 | B2 | 11/2019 | Lenius |
| 10,491,855 | B2 | 11/2019 | Gates |
| 10,495,757 | B2 | 12/2019 | Dussan |
| 10,502,813 | B2 | 12/2019 | Schultz |
| 10,503,174 | B1 | 12/2019 | Lim |
| 10,503,175 | B2 | 12/2019 | Agarwal |
| 10,509,111 | B2 | 12/2019 | Park |
| 10,509,112 | B1 | 12/2019 | Pan |
| 10,509,120 | B2 | 12/2019 | Bilik |
| 10,509,198 | B1 | 12/2019 | Zhou |
| 10,514,444 | B2 | 12/2019 | Donovan |
| 10,514,447 | B2 | 12/2019 | Schwarz |
| 10,520,591 | B2 | 12/2019 | Kotelnikov |
| 10,520,592 | B2 | 12/2019 | Droz |
| 10,520,602 | B2 | 12/2019 | Villeneuve |
| 10,523,880 | B2 | 12/2019 | Gassend |
| 10,527,726 | B2 | 1/2020 | Bartlett |
| 10,531,004 | B2 | 1/2020 | Wheeler |
| 10,534,074 | B2 | 1/2020 | Slobodyyanyuk |
| 10,534,079 | B2 | 1/2020 | Kim |
| 10,539,116 | B2 | 1/2020 | Davoust |
| 10,539,661 | B2 | 1/2020 | Hall |
| 10,539,663 | B2 | 1/2020 | Liu |
| 10,545,222 | B2 | 1/2020 | Hall |
| 10,545,238 | B1 | 1/2020 | Rezk |
| 10,545,240 | B2 | 1/2020 | Campbell |
| 10,545,289 | B1 | 1/2020 | Chriqui |
| 10,552,691 | B2 | 2/2020 | Li |
| 10,556,585 | B1 | 2/2020 | Berger |
| 10,557,923 | B2 | 2/2020 | Watnik |
| 10,557,924 | B2 | 2/2020 | Jang |
| 10,557,926 | B2 | 2/2020 | Gilliland |
| 10,557,927 | B2 | 2/2020 | Marron |
| 10,557,929 | B2 | 2/2020 | Kajiyama |
| 10,557,939 | B2 | 2/2020 | Campbell |
| 10,557,940 | B2 | 2/2020 | Eichenholz |
| 10,557,942 | B2 | 2/2020 | Belsey |
| 10,564,261 | B2 | 2/2020 | Huebner |
| 10,564,263 | B2 | 2/2020 | Efimov |
| 10,564,266 | B2 | 2/2020 | O'Keeffe |
| 10,564,285 | B2 | 2/2020 | Belsley |
| 10,565,457 | B2 | 2/2020 | Luo |
| 10,571,552 | B1 | 2/2020 | Gao |
| 10,571,567 | B2 | 2/2020 | Campbell |
| 10,571,570 | B1 | 2/2020 | Paulsen |
| 10,571,574 | B1 * | 2/2020 | Yavid ...................... G01S 17/89 |
| 10,571,683 | B2 | 2/2020 | Low |
| 10,576,011 | B1 | 3/2020 | Krishnan |
| 10,578,717 | B2 | 3/2020 | Bucina |
| 10,578,719 | B2 | 3/2020 | O'Keeffe |
| 10,578,720 | B2 | 3/2020 | Hughes |
| 10,578,721 | B2 | 3/2020 | Jang |
| 10,578,724 | B2 | 3/2020 | Droz |
| 10,578,742 | B2 | 3/2020 | Guo |
| 10,585,174 | B2 | 3/2020 | Gnecchi |
| 10,585,175 | B2 | 3/2020 | Reterath |
| 10,591,598 | B2 | 3/2020 | Jeong |
| 10,591,599 | B2 | 3/2020 | O'keeffe |
| 10,591,600 | B2 | 3/2020 | Villeneuve |
| 10,591,601 | B2 | 3/2020 | Hicks |
| 10,591,604 | B2 | 3/2020 | Xu |
| 10,591,740 | B2 | 3/2020 | McMichael |
| 10,598,769 | B2 | 3/2020 | Rodrigo |
| 10,598,770 | B2 | 3/2020 | Singer |
| 10,598,788 | B1 | 3/2020 | Dussan |
| 10,598,791 | B2 | 3/2020 | Jain |
| 10,598,922 | B2 | 3/2020 | Low |
| 10,600,930 | B2 | 3/2020 | Suzuki |
| 10,605,899 | B2 | 3/2020 | Singer |
| 10,605,900 | B2 | 3/2020 | Spuler |
| 10,605,918 | B2 | 3/2020 | Wong |
| 10,605,924 | B2 | 3/2020 | Slutsky |
| RE47,942 | E | 4/2020 | Hall |
| D882,430 | S | 4/2020 | Haban |
| 10,551,501 | B1 | 4/2020 | LaChapelle |
| 10,613,200 | B2 | 4/2020 | Hallstig |
| 10,613,201 | B2 | 4/2020 | Pacala |
| 10,613,204 | B2 | 4/2020 | Warke |
| 10,613,224 | B2 | 4/2020 | Jeong |
| 10,620,301 | B2 | 4/2020 | Wilton |
| 10,620,302 | B2 | 4/2020 | Zhu |
| 10,620,315 | B2 | 4/2020 | Zellinger |
| 10,620,317 | B1 | 4/2020 | Chai |
| 10,620,318 | B2 | 4/2020 | Yi |
| 10,627,490 | B2 | 4/2020 | Hall |
| 10,627,491 | B2 | 4/2020 | Hall |
| 10,627,492 | B2 | 4/2020 | Shand |
| 10,627,495 | B2 | 4/2020 | Gaalema |
| 10,627,512 | B1 | 4/2020 | Hicks |
| 10,627,516 | B2 | 4/2020 | Eichenholz |
| 10,629,072 | B2 | 4/2020 | Felix |
| 10,630,913 | B2 | 4/2020 | Wei |
| 10,634,772 | B2 | 4/2020 | Eckstein |
| 10,634,793 | B1 | 4/2020 | Siao |
| 10,641,870 | B1 | 5/2020 | Magnani |
| 10,641,872 | B2 | 5/2020 | Dussan |
| 10,641,873 | B2 | 5/2020 | Dussan |
| 10,641,874 | B2 | 5/2020 | Campbell |
| 10,641,876 | B2 | 5/2020 | Field |

(56) References Cited

U.S. PATENT DOCUMENTS

| | | |
|---|---|---|
| 10,641,877 B2 | 5/2020 | Lombrozo |
| 10,641,878 B2 | 5/2020 | Yeo |
| 10,641,897 B1 | 5/2020 | Dussan |
| 10,641,900 B2 | 5/2020 | Dussan |
| 10,642,029 B2 | 5/2020 | Dussan |
| 10,649,072 B2 | 5/2020 | Bozchalooi |
| 10,649,086 B2 | 5/2020 | Raring |
| 10,650,531 B2 | 5/2020 | Lakshmi Narayanan |
| 10,656,252 B1 | 5/2020 | Dussan |
| 10,656,272 B1 | 5/2020 | Dussan |
| 10,656,277 B1 | 5/2020 | Dussan |
| 10,663,584 B2 | 5/2020 | Sakai |
| 10,663,587 B1 | 5/2020 | Sandborn |
| 10,663,590 B2 | 5/2020 | Rzeszutek |
| 10,663,596 B2 | 5/2020 | Dussan |
| RE48,042 E | 6/2020 | Pennecot |
| 10,670,460 B1 | 6/2020 | Waterbury |
| 10,670,702 B2 | 6/2020 | Choi |
| 10,670,718 B1 | 6/2020 | Dussan |
| 10,670,721 B2 | 6/2020 | Efimov |
| 10,670,724 B2 | 6/2020 | Moon |
| 10,677,897 B2 | 6/2020 | LaChapelle |
| 10,677,925 B2 | 6/2020 | Boehmke |
| 10,684,359 B2 | 6/2020 | Axelsson |
| 10,684,360 B2 | 6/2020 | Campbell |
| 10,690,754 B2 | 6/2020 | Pei |
| 10,690,756 B2 | 6/2020 | Warke |
| 10,690,772 B2 | 6/2020 | Van Voorst |
| 10,697,582 B2 | 6/2020 | Campbell |
| 10,698,088 B2 | 6/2020 | Droz |
| 10,698,114 B2 | 6/2020 | Keilaf |
| 10,705,189 B2 | 7/2020 | Qiu |
| 10,705,190 B2 | 7/2020 | Jang |
| 10,712,433 B2 | 7/2020 | Carothers |
| 10,712,434 B2 | 7/2020 | Hall |
| 10,714,889 B2 | 7/2020 | Hong |
| 10,725,156 B2 | 7/2020 | Halmos |
| 10,725,177 B2 | 7/2020 | Smits |
| 10,726,567 B2 | 7/2020 | Lee |
| 10,726,579 B1 | 7/2020 | Huang |
| 10,732,264 B2 | 8/2020 | Bailey |
| 10,732,266 B2 | 8/2020 | Popovich |
| 10,732,279 B2 | 8/2020 | Schlotterbeck |
| 10,732,281 B2 | 8/2020 | LaChapelle |
| 10,732,287 B2 | 8/2020 | Korsgard Jensen |
| 10,739,440 B2 | 8/2020 | Shimizu |
| 10,739,441 B2 | 8/2020 | Nabbe |
| 10,739,444 B2 | 8/2020 | Hall |
| 10,739,459 B2 | 8/2020 | Castorena Martinez |
| 10,739,461 B2 | 8/2020 | Agarwal |
| 10,746,858 B2 | 8/2020 | Bradley |
| 10,754,009 B2 | 8/2020 | Sung |
| 10,754,012 B2 | 8/2020 | Galloway |
| 10,754,033 B2 | 8/2020 | Shand |
| 10,754,034 B1 | 8/2020 | Chamberlain |
| 10,761,191 B2 | 9/2020 | Qiu |
| 10,761,195 B2 | 9/2020 | Donovan |
| 10,761,196 B2 | 9/2020 | Dussan |
| 10,762,673 B2 | 9/2020 | Luo |
| 10,763,290 B2 | 9/2020 | Akselrod |
| 10,768,282 B2 | 9/2020 | Crouch |
| 10,768,303 B2 | 9/2020 | Xiong |
| 10,775,484 B2 | 9/2020 | Jeong |
| 10,775,485 B2 | 9/2020 | Shim |
| 10,775,488 B2 | 9/2020 | Bradley |
| 10,775,507 B2 | 9/2020 | Mandai |
| 10,782,393 B2 | 9/2020 | Dussan |
| 10,782,399 B2 | 9/2020 | Lee |
| 10,782,409 B2 | 9/2020 | Wang |
| 10,788,574 B2 | 9/2020 | Shim |
| 10,732,283 B2 | 10/2020 | Gilliland |
| 10,754,015 B2 | 10/2020 | Dussan |
| 10,791,884 B2 | 10/2020 | Starkey |
| 10,794,998 B2 | 10/2020 | Spuler |
| 10,795,000 B2 | 10/2020 | Singer |
| 10,796,457 B2 | 10/2020 | Beek |
| 10,802,119 B2 | 10/2020 | Yoon |
| 10,802,120 B1 | 10/2020 | LaChapelle |
| 10,802,122 B1 | 10/2020 | Goldberg |
| 10,802,149 B2 | 10/2020 | Stettner |
| 10,809,361 B2 | 10/2020 | Vallespi-Gonzalez |
| 10,809,362 B2 | 10/2020 | Fredericksen |
| 10,809,380 B2 | 10/2020 | Pacala |
| 10,816,647 B2 | 10/2020 | Xiang |
| 10,816,648 B2 | 10/2020 | Pennecot |
| 10,816,649 B1 | 10/2020 | Keyser |
| 10,818,091 B2 | 10/2020 | Evans |
| 10,819,082 B2 | 10/2020 | Josset |
| 10,821,942 B2 | 11/2020 | Green |
| 10,823,855 B2 | 11/2020 | Li |
| 10,830,877 B1 | 11/2020 | Chawla |
| 10,830,878 B2 | 11/2020 | McMichael |
| 10,830,880 B2 | 11/2020 | Subasingha |
| 10,830,890 B1 | 11/2020 | Keyser |
| 10,837,773 B2 | 11/2020 | Yang |
| 10,838,042 B2 | 11/2020 | Badoni |
| 10,838,045 B2 | 11/2020 | Crouch |
| 10,838,046 B2 | 11/2020 | Qui |
| 10,838,047 B2 | 11/2020 | Chong |
| 10,838,048 B2 | 11/2020 | Field |
| 10,838,049 B1 | 11/2020 | Schwiesow |
| 10,838,062 B2 | 11/2020 | de Mersseman |
| 10,841,496 B2 | 11/2020 | Wheeler |
| 10,844,838 B2 | 11/2020 | Schlipf |
| 10,845,464 B2 | 11/2020 | Schwarz |
| 10,845,466 B2 | 11/2020 | Pei |
| 10,845,468 B2 | 11/2020 | Marron |
| 10,845,470 B2 | 11/2020 | Verghese |
| 10,845,480 B1 | 11/2020 | Shah |
| 10,845,482 B2 | 11/2020 | Frederiksen |
| 10,845,587 B2 | 11/2020 | Low |
| 10,852,397 B2 | 12/2020 | Schwarz |
| 10,852,398 B2 | 12/2020 | Yu |
| 10,852,426 B2 | 12/2020 | Shan |
| 10,852,433 B2 | 12/2020 | Chen |
| 10,852,437 B2 | 12/2020 | Eken |
| 10,852,438 B2 | 12/2020 | Hartman |
| 10,859,683 B2 | 12/2020 | Lin |
| 10,859,684 B1 | 12/2020 | Nabatchian |
| 10,866,312 B2 | 12/2020 | Crouch |
| 10,866,319 B2 | 12/2020 | Brinkmeyer |
| 10,871,554 B1 | 12/2020 | Keyser |
| 10,871,779 B2 | 12/2020 | Templeton |
| 10,872,269 B2 | 12/2020 | Roy Chowdhury |
| 10,877,131 B2 | 12/2020 | Singer |
| 10,877,134 B2 | 12/2020 | Han |
| 10,877,154 B2 | 12/2020 | Bronstein |
| 10,878,282 B2 | 12/2020 | Mei |
| 10,878,580 B2 | 12/2020 | Mei |
| 10,879,415 B2 | 12/2020 | Kwon |
| 10,884,126 B2 | 1/2021 | Shu |
| 10,884,129 B2 | 1/2021 | Wu |
| 10,884,130 B1 | 1/2021 | Viswanatha |
| 10,884,131 B1 | 1/2021 | Allais |
| 10,884,411 B1 | 1/2021 | Allais |
| 10,890,650 B2 | 1/2021 | Droz |
| 10,891,744 B1 | 1/2021 | Wyffels |
| 10,897,575 B2 | 1/2021 | Wheeler |
| 10,901,074 B1 | 1/2021 | Pan |
| 10,901,089 B2 | 1/2021 | Zhang |
| 10,901,292 B2 | 1/2021 | Jeong |
| D909,216 S | 2/2021 | Vuletici |
| 10,908,080 B2 | 2/2021 | Salazar |
| 10,908,262 B2 | 2/2021 | Dussan |
| 10,908,264 B2 | 2/2021 | O'Keeffe |
| 10,908,265 B2 | 2/2021 | Dussan |
| 10,908,267 B1 | 2/2021 | Gagne |
| 10,908,268 B2 | 2/2021 | Zhou |
| 10,908,282 B2 | 2/2021 | Meyers |
| 10,908,287 B2 | 2/2021 | Warke |
| 10,908,372 B2 | 2/2021 | Moebius |
| 10,908,409 B2 | 2/2021 | Zhou |
| 10,914,821 B2 | 2/2021 | Patterson |
| 10,914,822 B2 | 2/2021 | Kremer |

(56) References Cited

U.S. PATENT DOCUMENTS

| | | |
|---|---|---|
| 10,914,824 B2 | 2/2021 | Meng |
| 10,914,825 B2 | 2/2021 | Coda |
| 10,914,839 B2 | 2/2021 | Hartmann |
| 10,914,841 B2 | 2/2021 | Crouch |
| 10,921,431 B2 | 2/2021 | Pei |
| 10,921,450 B2 | 2/2021 | Dussan |
| 10,921,452 B2 | 2/2021 | Crouch |
| 10,921,453 B2 | 2/2021 | Dumais |
| 10,922,880 B2 | 2/2021 | Scanlon |
| 10,928,485 B1 | 2/2021 | Karadeniz |
| 10,928,486 B2 | 2/2021 | Donovan |
| 10,928,487 B2 | 2/2021 | O'Keeffe |
| 10,928,488 B2 | 2/2021 | Sun |
| 10,928,490 B2 | 2/2021 | Tatipamula |
| 10,928,519 B2 | 2/2021 | Schaffner |
| 10,929,694 B1 | 2/2021 | Zhang |
| RE48,490 E | 3/2021 | Hall |
| RE48,491 E | 3/2021 | Hall |
| 10,935,637 B2 | 3/2021 | Cullumber |
| 10,935,640 B2 | 3/2021 | Jackson |
| 10,935,658 B2 | 3/2021 | Park |
| 10,935,659 B2 | 3/2021 | Smits |
| 10,939,057 B2 | 3/2021 | Gassend |
| 10,942,257 B2 | 3/2021 | Bao |
| 10,942,260 B2 | 3/2021 | Low |
| 10,942,272 B2 | 3/2021 | Droz |
| 10,942,277 B1 | 3/2021 | Angus |
| 10,948,598 B1 | 3/2021 | Prabhakar |
| 10,951,864 B2 | 3/2021 | Droz |
| 10,955,530 B2 | 3/2021 | Pei |
| 10,955,532 B2 | 3/2021 | Gilliland |
| 10,955,533 B2 | 3/2021 | Konrad |
| 10,955,534 B2 | 3/2021 | Halmos |
| 10,955,545 B1 | 3/2021 | Hunt |
| 10,955,952 B2 | 3/2021 | Gwon |
| 10,962,644 B1 | 3/2021 | Kong |
| 10,962,647 B2 | 3/2021 | Shin |
| 10,965,379 B2 | 3/2021 | Brown |
| RE48,503 E | 4/2021 | Hall |
| RE48,504 E | 4/2021 | Hall |
| 10,969,474 B2 | 4/2021 | O'keeffe |
| 10,969,475 B2 | 4/2021 | Li |
| 10,969,489 B2 | 4/2021 | Schmitt |
| 10,969,491 B1 | 4/2021 | Krause Perin |
| 10,976,413 B2 | 4/2021 | Han |
| 10,976,414 B2 | 4/2021 | Sayyah |
| 10,976,417 B2 | 4/2021 | LaChapelle |
| 10,979,644 B2 | 4/2021 | Jamjoom |
| 10,983,197 B1 | 4/2021 | Zhu |
| 10,983,201 B2 | 4/2021 | Pimentel |
| 10,983,213 B2 | 4/2021 | Eichenholz |
| 10,983,215 B2 | 4/2021 | Li |
| 10,983,218 B2 | 4/2021 | Hall |
| 10,983,219 B2 | 4/2021 | Kotov |
| 10,984,540 B2 | 4/2021 | Mei |
| 10,989,796 B2 | 4/2021 | Liu |
| 10,989,914 B2 | 4/2021 | Ramsey |
| 10,996,322 B2 | 5/2021 | Buettner |
| 10,996,334 B2 | 5/2021 | Datta |
| 10,999,511 B2 | 5/2021 | Yang |
| 11,002,832 B2 | 5/2021 | Sayyah |
| 11,002,834 B2 | 5/2021 | Kaestner |
| 11,002,837 B2 | 5/2021 | Barber |
| 11,002,839 B2 | 5/2021 | Shi |
| 11,002,852 B2 | 5/2021 | Cao |
| 11,002,853 B2 | 5/2021 | McWhirter |
| 11,002,857 B2 | 5/2021 | Dussan |
| 11,003,137 B2 | 5/2021 | Christmas |
| 11,009,592 B2 | 5/2021 | Wilton |
| 11,009,605 B2 | 5/2021 | Li |
| 11,016,178 B2 | 5/2021 | Donovan |
| 11,016,181 B2 | 5/2021 | Schwarz |
| 11,016,183 B2 | 5/2021 | Gill |
| 11,016,195 B2 | 5/2021 | Balbas |
| 11,016,197 B1 | 5/2021 | Barber |
| 11,016,496 B2 | 5/2021 | Chen |
| 11,022,682 B2 | 6/2021 | Konrad |
| 11,022,688 B2 | 6/2021 | Eichenholz |
| 11,022,689 B2 | 6/2021 | Villeneuve |
| 11,022,691 B2 | 6/2021 | Frederiksen |
| 11,022,693 B1 | 6/2021 | Allais |
| 11,024,669 B2 | 6/2021 | Rezk |
| 11,027,726 B2 | 6/2021 | Stettner |
| 11,029,393 B2 | 6/2021 | Li |
| 11,029,394 B2 | 6/2021 | Li |
| 11,029,395 B1 | 6/2021 | Barber |
| 11,029,398 B2 | 6/2021 | Hwang |
| 11,029,406 B2 | 6/2021 | LaChapelle |
| 11,035,933 B2 | 6/2021 | Demir |
| 11,035,957 B2 | 6/2021 | Shotan |
| 11,041,942 B2 | 6/2021 | Ruchatz |
| 11,041,944 B2 | 6/2021 | Zhu |
| 11,041,954 B2 | 6/2021 | Crouch |
| 11,041,956 B2 | 6/2021 | Harris |
| 11,041,957 B2 | 6/2021 | Uehara |
| 11,043,005 B2 | 6/2021 | Wallin |
| 11,047,958 B1 | 6/2021 | Choiniere |
| 11,047,963 B1 | 6/2021 | Viswanatha |
| 11,047,983 B1 | 6/2021 | Prabhakar |
| 11,054,505 B2 | 7/2021 | Droz |
| 11,054,508 B2 | 7/2021 | Li |
| 11,054,523 B1 | 7/2021 | Buchter |
| 11,054,524 B2 | 7/2021 | Rezk |
| 11,061,116 B2 | 7/2021 | Gao |
| 11,061,140 B2 | 7/2021 | Hosseini |
| 11,063,408 B2 | 7/2021 | Jang |
| 11,067,670 B2 | 7/2021 | Patterson |
| 11,067,671 B2 | 7/2021 | Chong |
| 11,067,673 B2 | 7/2021 | Wei |
| 11,067,676 B2 | 7/2021 | Yang |
| 11,067,693 B2 | 7/2021 | Walls |
| 11,119,218 B2 | 9/2021 | Patterson |
| 11,150,349 B2 | 10/2021 | Chen |
| 11,156,716 B1* | 10/2021 | Yavid .................... G01S 7/4863 |
| 2002/0140294 A1 | 10/2002 | Iwata |
| 2005/0173770 A1 | 8/2005 | Linden et al. |
| 2007/0035624 A1 | 2/2007 | Lubard |
| 2009/0273770 A1 | 11/2009 | Bauhahn |
| 2010/0053715 A1 | 3/2010 | O'Neil |
| 2010/0204974 A1 | 8/2010 | Israelsen |
| 2012/0170024 A1 | 7/2012 | Azzazy |
| 2012/0170029 A1 | 7/2012 | Azzazy |
| 2012/0236379 A1* | 9/2012 | da Silva ................ G01S 7/4817 |
| | | 359/200.8 |
| 2013/0120734 A1 | 5/2013 | Ogata |
| 2013/0242283 A1 | 9/2013 | Bailey |
| 2014/0168634 A1* | 6/2014 | Kameyama ............. G01S 17/88 |
| | | 356/601 |
| 2015/0192677 A1 | 7/2015 | Yu |
| 2015/0301180 A1 | 10/2015 | Stettner |
| 2015/0329111 A1 | 11/2015 | Prokhorov |
| 2016/0162743 A1 | 6/2016 | Chundrlik |
| 2017/0328990 A1 | 11/2017 | Magee |
| 2020/0101890 A1 | 4/2020 | Solar |

FOREIGN PATENT DOCUMENTS

| | | |
|---|---|---|
| CN | 2681085 Y | 2/2006 |
| CN | 2773714 Y | 4/2006 |
| CN | 103278808 B | 12/2015 |
| CN | 104299244 B | 7/2017 |
| CN | 206773192 U | 12/2017 |
| CN | 106443699 B | 2/2019 |
| CN | 106597471 B | 5/2019 |
| CN | 208902906 U | 5/2019 |
| CN | 109997057 B | 7/2020 |
| DE | 930909 C | 7/1955 |
| DE | 3134815 A1 | 3/1983 |
| DE | 3216312 A1 | 11/1983 |
| DE | 3216313 A1 | 11/1983 |
| DE | 3701340 A1 | 7/1988 |
| DE | 3741259 A1 | 6/1989 |
| DE | 3808972 A1 | 10/1989 |
| DE | 3821892 C1 | 2/1990 |

(56) References Cited

FOREIGN PATENT DOCUMENTS

| | | |
|---|---|---|
| DE | 4040894 C1 | 4/1992 |
| DE | 4115747 A1 | 11/1992 |
| DE | 4124192 A1 | 1/1993 |
| DE | 4127168 A1 | 2/1993 |
| DE | 4137550 A1 | 3/1993 |
| DE | 4215272 A1 | 11/1993 |
| DE | 4243631 A1 | 6/1994 |
| DE | 4340756 A1 | 6/1994 |
| DE | 4411448 A1 | 10/1995 |
| DE | 4412044 A1 | 10/1995 |
| DE | 19512644 A1 | 10/1996 |
| DE | 19512681 A1 | 10/1996 |
| DE | 4345446 C2 | 7/1998 |
| DE | 4345448 C2 | 7/1998 |
| DE | 19727792 A1 | 2/1999 |
| DE | 19741730 A1 | 4/1999 |
| DE | 19741731 A1 | 4/1999 |
| DE | 19752145 A1 | 5/1999 |
| DE | 19717399 A1 | 6/1999 |
| DE | 19757847 A1 | 7/1999 |
| DE | 19757848 A1 | 7/1999 |
| DE | 19757849 A1 | 7/1999 |
| DE | 19757840 C1 | 9/1999 |
| DE | 19815149 A1 | 10/1999 |
| DE | 19828000 A1 | 1/2000 |
| DE | 19902903 C1 | 5/2000 |
| DE | 19911375 A1 | 9/2000 |
| DE | 19919925 A1 | 11/2000 |
| DE | 19927501 A1 | 11/2000 |
| DE | 19936440 A1 | 3/2001 |
| DE | 19953006 A1 | 5/2001 |
| DE | 19953007 A1 | 5/2001 |
| DE | 19953009 A1 | 5/2001 |
| DE | 19953010 A1 | 5/2001 |
| DE | 10025511 C1 | 12/2001 |
| DE | 10110420 A1 | 9/2002 |
| DE | 10114362 A1 | 10/2002 |
| DE | 10127417 A1 | 12/2002 |
| DE | 10128954 A1 | 12/2002 |
| DE | 10141055 A1 | 3/2003 |
| DE | 10143060 A1 | 3/2003 |
| DE | 10146692 A1 | 4/2003 |
| DE | 10148070 A1 | 4/2003 |
| DE | 10151983 A1 | 4/2003 |
| DE | 10162668 A1 | 7/2003 |
| DE | 10217295 A1 | 11/2003 |
| DE | 10222797 A1 | 12/2003 |
| DE | 10229408 A1 | 1/2004 |
| DE | 10244638 A1 | 4/2004 |
| DE | 10244640 A1 | 4/2004 |
| DE | 10244643 A1 | 4/2004 |
| DE | 10258794 A1 | 6/2004 |
| DE | 10303015 A1 | 8/2004 |
| DE | 10331529 A1 | 1/2005 |
| DE | 10341548 A1 | 3/2005 |
| DE | 102004010197 A1 | 9/2005 |
| DE | 102004014041 A1 | 10/2005 |
| DE | 102005050824 A1 | 5/2006 |
| DE | 102005003827 A1 | 7/2006 |
| DE | 102005019233 A1 | 11/2006 |
| DE | 102007013023 A1 | 9/2008 |
| DE | 102007044536 A1 | 3/2009 |
| DE | 202015009250 U1 | 1/2017 |
| EP | 0185816 A1 | 7/1986 |
| EP | 0361188 A2 | 4/1990 |
| EP | 0396865 A2 | 11/1990 |
| EP | 0412395 A1 | 2/1991 |
| EP | 0412398 A1 | 2/1991 |
| EP | 0412399 A1 | 2/1991 |
| EP | 0412400 A1 | 2/1991 |
| EP | 0468175 A2 | 1/1992 |
| EP | 0486430 A2 | 5/1992 |
| EP | 0653720 A2 | 5/1995 |
| EP | 0656868 A1 | 6/1995 |
| EP | 0897120 A2 | 2/1999 |
| EP | 0913707 A1 | 5/1999 |
| EP | 0937996 A2 | 8/1999 |
| EP | 0967492 A1 | 12/1999 |
| EP | 1046938 A2 | 10/2000 |
| EP | 1055937 A2 | 11/2000 |
| EP | 1148345 A1 | 10/2001 |
| EP | 1160718 A2 | 12/2001 |
| EP | 1174733 A2 | 1/2002 |
| EP | 1267177 A1 | 12/2002 |
| EP | 1267178 A1 | 12/2002 |
| EP | 1286178 A2 | 2/2003 |
| EP | 1286181 A1 | 2/2003 |
| EP | 1288677 A2 | 3/2003 |
| EP | 1291673 A2 | 3/2003 |
| EP | 1291674 A2 | 3/2003 |
| EP | 1298012 A2 | 4/2003 |
| EP | 1298454 A2 | 4/2003 |
| EP | 1298543 A2 | 4/2003 |
| EP | 1300715 A2 | 4/2003 |
| EP | 1302784 A2 | 4/2003 |
| EP | 1304583 A2 | 4/2003 |
| EP | 1306690 A2 | 5/2003 |
| EP | 1308747 A2 | 5/2003 |
| EP | 1355128 A1 | 10/2003 |
| EP | 1403657 A1 | 3/2004 |
| EP | 1408318 A1 | 4/2004 |
| EP | 1418444 A1 | 5/2004 |
| EP | 1460454 A2 | 9/2004 |
| EP | 1475764 A2 | 11/2004 |
| EP | 1515157 A1 | 3/2005 |
| EP | 1531342 A1 | 5/2005 |
| EP | 1531343 A1 | 5/2005 |
| EP | 1548351 A2 | 6/2005 |
| EP | 1557691 A1 | 7/2005 |
| EP | 1557693 A1 | 7/2005 |
| EP | 1557694 A1 | 7/2005 |
| EP | 1557992 A1 | 7/2005 |
| EP | 1700763 A2 | 9/2006 |
| EP | 1914564 A1 | 4/2008 |
| EP | 1927867 A1 | 6/2008 |
| EP | 1939652 A1 | 7/2008 |
| EP | 1947377 A1 | 7/2008 |
| EP | 1965225 | 9/2008 |
| EP | 1983354 A1 | 10/2008 |
| EP | 2003471 A1 | 12/2008 |
| EP | 2177931 A2 | 4/2010 |
| EP | 2503360 A1 | 9/2012 |
| EP | 2631667 | 8/2013 |
| EP | 2994772 | 3/2016 |
| EP | 3029488 | 6/2016 |
| EP | 2122599 B1 | 11/2019 |
| EP | 3671261 A1 | 6/2020 |
| GB | 2041687 A | 9/1980 |
| GB | 2251150 A | 6/1992 |
| GB | 2463815 | 3/2010 |
| JP | H36407 | 1/1991 |
| JP | H05240940 A | 9/1993 |
| JP | H6288725 | 10/1994 |
| JP | 2011264871 | 9/1999 |
| JP | 2001216592 | 8/2001 |
| JP | 20012656576 | 9/2001 |
| JP | 2009086787 A | 4/2009 |
| JP | 6039704 B2 | 12/2016 |
| JP | 2017162204 A | 9/2017 |
| JP | 2020521955 A | 7/2020 |
| RU | 2480712 | 4/2013 |
| WO | WO1999/003080 A1 | 1/1999 |
| WO | WO2000/025089 A1 | 5/2000 |
| WO | WO01/31608 A1 | 5/2001 |
| WO | WO03/019234 A1 | 3/2003 |
| WO | WO03/040755 A2 | 5/2003 |
| WO | WO2004/019293 A1 | 3/2004 |
| WO | WO2004/036245 A2 | 4/2004 |
| WO | WO2008/008970 A2 | 1/2008 |
| WO | WO2009/120706 A2 | 10/2009 |
| WO | WO2010141631 A1 | 12/2010 |
| WO | WO2015/079300 A1 | 6/2015 |
| WO | WO2015/104572 A1 | 7/2015 |
| WO | WO2016/162568 A1 | 10/2016 |

(56) References Cited

FOREIGN PATENT DOCUMENTS

| WO | WO2017/033419 A1 | 3/2017 |
|----|------------------|--------|
| WO | WO2017/089063 A1 | 6/2017 |
| WO | WO2017/132703 A1 | 8/2017 |
| WO | WO2017/164989 A1 | 9/2017 |
| WO | WO2017/165316 A1 | 9/2017 |
| WO | WO2017/193269 A1 | 11/2017 |
| WO | WO2018/125823 A1 | 7/2018 |
| WO | WO2018/196001 A1 | 11/2018 |

\* cited by examiner

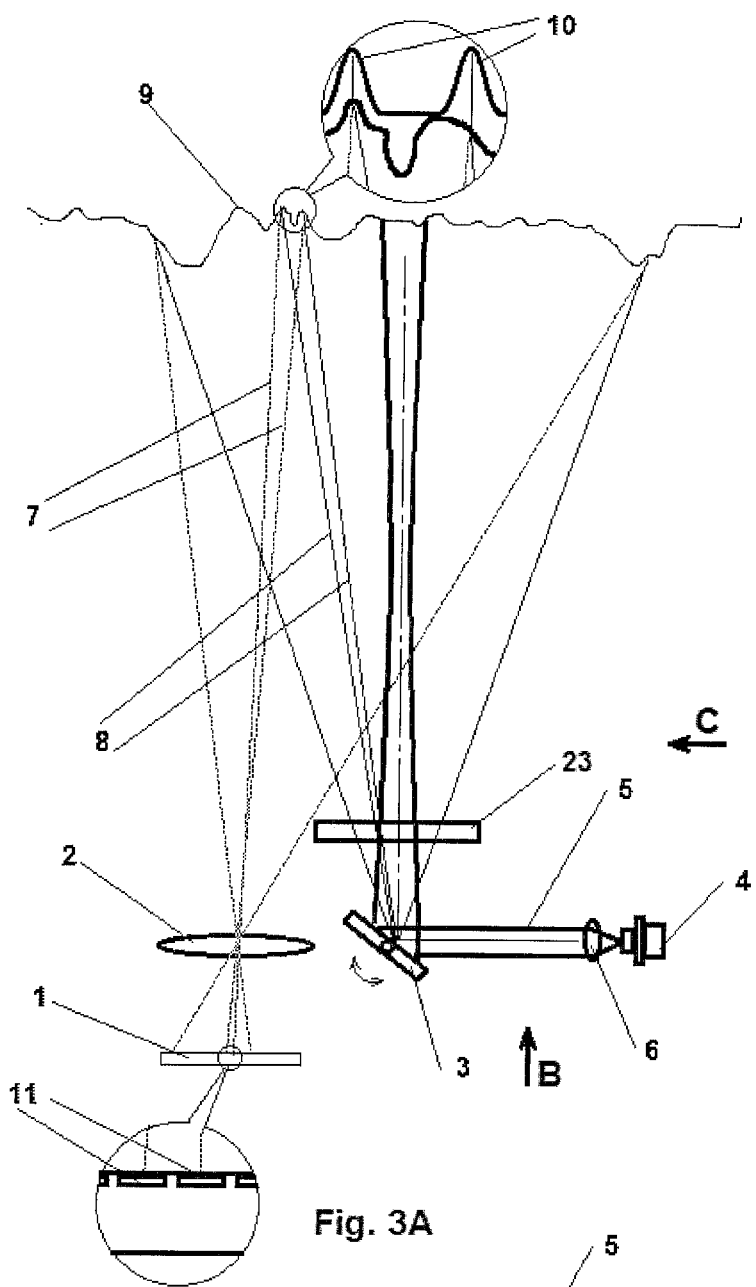
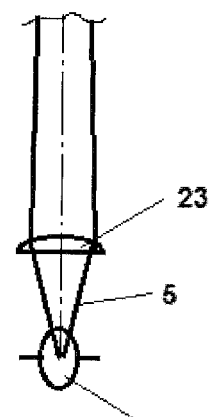
Fig. 3A
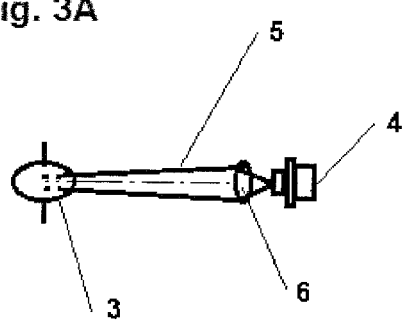
Fig. 3B
Fig. 3C

HYBRID LADAR WITH CO-PLANAR SCANNING AND IMAGING FIELD-OF-VIEW

CROSS-REFERENCE TO RELATED APPLICATIONS

This application is a continuation of U.S. application Ser. No. 15/432,105, which claims priority on U.S. Provisional Application Ser. No. 62/295,210, filed on Feb. 15, 2016, all disclosures of which are incorporated herein by reference.

FIELD OF THE INVENTION

The present invention relates generally to the field of optical Time-of-Flight (ToF) measurement, and more specifically, to directionally-resolved ToF measurement technology, known as Laser Radar (LADAR).

BACKGROUND OF THE INVENTION

The need for early warning of an invading force dates back to the ancient world, which could involve scouts traveling on foot or by horse back, and eventually included use of telescopes and binoculars for an enhanced view of the enemy. In the modern era, beginning in World War II, radio detection and ranging (RADAR) systems were deployed, and which utilize reflected radio waves to identify the position of enemy aircraft. Sonar similarly uses sound waves to locate vessels within the oceans. Soon after the development of laser technologies, light/laser detection and ranging (LIDAR/LADAR) systems underwent development.

LADAR is generally based on emitting short pulses of light within certain Field-Of-View (FOV) at precisely-controlled moments, collecting the reflected light and determining its Time-of-Arrival, possibly, separately from different directions. Subtraction of the pulse emission time from ToA yields ToF, and that, in turns, allows one to determine the distance to the target the light was reflected from. LADAR is the most promising vision technology for autonomous vehicles of different kinds, as well as surveillance, security, industrial automation, and many other areas, where detailed information about the immediate surroundings is required. While lacking the range of radar, LADAR has a much higher resolution due to much shorter wavelengths that are used for sensing, and hence, comparatively relaxed diffractive limitations. It may be especially useful for moving vehicles, both manned, self-driving, and unmanned, if it could provide detailed 3D information in real-time, with the potential to revolutionize vehicles' sensing abilities and enable a variety of missions and applications.

However, until recently, LADARs have been prohibitively large and expensive for vehicular use. They were also lacking in desirable performance: to become a true real-time vision technology, LADAR must provide high-resolution imagery, at high frame rates, comparable with video cameras, in the range of 15-60 fps, and cover a substantial solid angle. Ideally, a LADAR with omnidirectional coverage of 360° azimuth and 180° elevation would be very beneficial. Collectively, these requirements may be called "real-time 3D vision".

A variety of approaches has been suggested and tried, including mechanical scanning, non-mechanical scanning, and imaging time-of-flight (ToF) focal-plane arrays (FPA). There is also a variety of laser types, detectors, signal processing techniques, etc. that have been used to date, as shown by the following.

U.S. Patent Application Pub. No. 2012/0170029 by Azzazy teaches 2D focal plane array (FPA) in the form of a micro-channel plate, illuminated in its entirety by a short power pulse of light. This arrangement is generally known as flash LADAR.

U.S. Patent Application Pub. No. 2012/0261516 by Gilliland teaches another embodiment of flash LADAR, with a two dimensional array of avalanche photodiodes illuminated in its entirety as well.

U.S. Patent Application Pub. No. 2007/0035624 by Lubard teaches a similar arrangement with a 1D array of detectors, still illuminated together, while U.S. Pat. No. 6,882,409 to Evans further adds sensitivity to different wavelengths to flash LADAR. Another approach is the use a 2D scanner and only one detector receiving reflected light sequentially from every point in the FOV, as taught by US Patent Application Pub. No. 2012/0236379 by da Silva.

Additional improvements to this approach are offered by U.S. Pat. No. 9,383,753 to Templeton, teaching a synchronous scan of the FOV of a single receiver via an array of synchronized MEMS mirrors. This arrangement is known as retro-reflective.

Yet another approach is to combine multiple lasers and multiple detectors in a single scanned FOV, as taught by U.S. Pat. No. 8,767,190 to Hall.

However, presently, such a real-time 3D LADAR remains elusive.

OBJECTS OF THE INVENTION

The present invention is aimed at overcoming the limitations of both scanning and imaging approaches to LADAR by combining their advantages and alleviating their problems, namely to:
1. Improve Signal-to-Noise Ratio (SNR);
2. Lower the peak power of illumination sources, reduce their cost and improve efficiency;
3. Reduce overall cost and power consumption; and
4. Increase the resolution.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the above-noted objects of this invention may be achieved by combining a relatively large 1D array of time-sensitive detectors (preferably, hundreds of pixels), with a relatively fast 1D laser scanner (preferably, tens of kHz in frequency), in a co-planar configuration, that allows collection of one line of ToF data during each scan. Optionally, the planar FOV of both the scanner and the detector is also scanned in an orthogonal direction at a slower rate, thus providing a 2D FOV.

BRIEF DESCRIPTION OF THE DRAWINGS

FIG. 3A illustrates tight focusing of the laser beam on the scanning mirror of a LADAR and subsequent re-collimation with a cylindrical lens.

FIG. 3B is a bottom view of the LADAR of FIG. 3A.

FIG. 3C is a side view of the LADAR of FIG. 3A.

FIG. 6A illustrates the laser of the LADAR system being continuously ON.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

The word "pixel" is used throughout this specification to denote an individual detector of a 1D detector array.

Also, all references (e.g., patents, published patent applications, and non-patent literature) that are cited within this document are incorporated herein in their entirety by reference.

Furthermore, the described features, advantages, and characteristics of any particular embodiment disclosed herein, may be combined in any suitable manner with any of the other embodiments disclosed herein.

In accordance with at least one embodiment of the hybrid LADAR system disclosed herein, a fast 1D scanner/imager hybrid can collect one line of high-resolution ToF data within tens of microseconds. If needed, that hybrid can also be coupled to a secondary, slow scanning stage, producing raster ToF frames of thousands of lines at high frame rates, with total pixel throughput of tens or even hundreds of megapixels per second.

The following description lists several embodiments of the present invention, which are merely exemplary of many variations and permutations of the subject matter disclosed.

Mention of one or more representative features of a given embodiment is likewise exemplary: an embodiment can exist with or without a given feature, and likewise, a given feature can be part of other embodiments.

Figure 1:
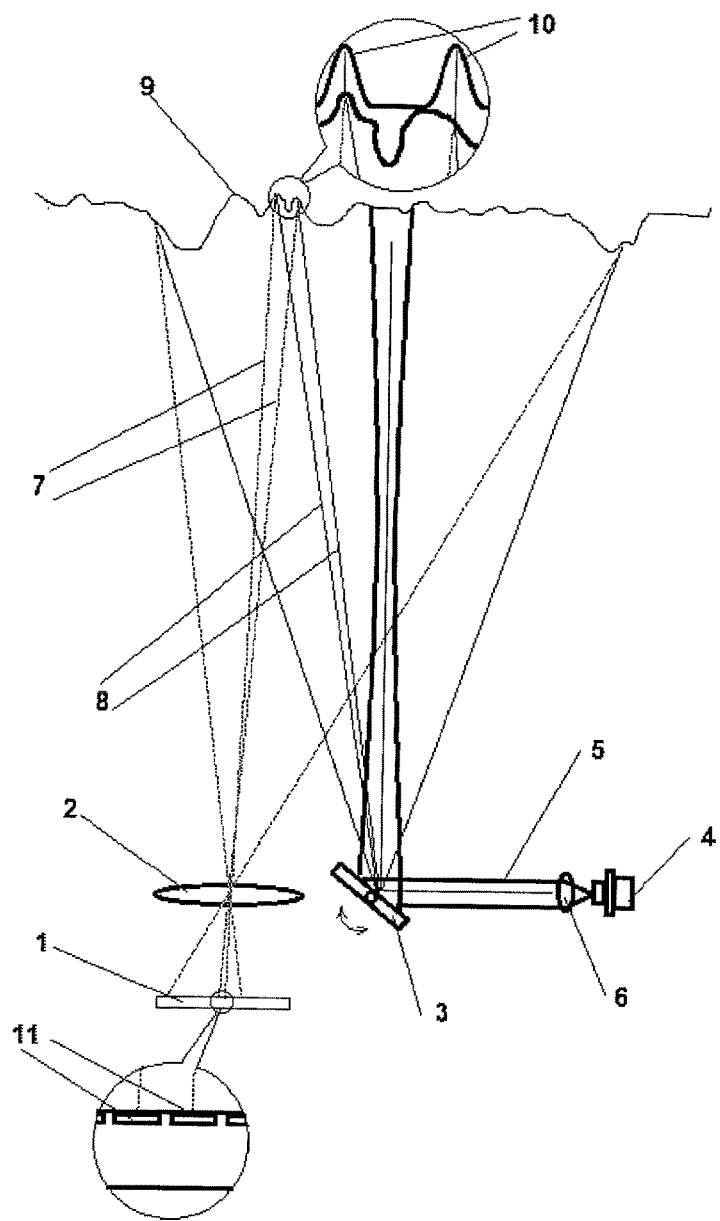
FIG. 1 illustrates a concept for a 1D scanning and imaging hybrid system.

A preferable embodiment of a 1D hybrid scanner/imager is illustrated in FIG. 1. It comprises a 1D array of photo-detectors 1, placed in a focal point of a receiving optical system 2, and a scanning mirror 3, its axis of rotation perpendicular to the direction of the detector array. A laser beam 5 generated by the laser 4 is directed onto the scanning mirror 3 through a collimating lens 6. The positions of the optical system 2 and the scanner 3 are adjusted in such way that the fan of imaginary rays 7 emanating from individual pixels of the array, and the fan of real laser rays 8 emanating from the scanning mirror 3 lay in the same plane. Respectively, the laser scan line on the target overlaps with the FOV of the detector array.

Preferably, the scanning mirror 3 is a resonant MEMS mirror. Such mirrors, having dimensions of the reflective area of the order of 1 sq. mm, the resonant frequencies of tens of kHz, and the scan amplitude of tens of degrees, are becoming commercially available. While generally this invention would benefit from the fastest rate of scanning, a general tendency in scanning mirrors is that the faster scanning rate typically leads to narrower scan angle and smaller mirror size, which in turn increases the divergence of the scanned laser beam, thus limiting the number and size of the detectors in the array, and the amount of light that can be collected onto the detectors, especially, at longer ranges.

This invention might further benefit from non-mechanical beam scanners (NMBS), that are undergoing development, although their specifications and commercial availability remain unclear. For example, U.S. Pat. No. 8,829,417 to Krill teaches a phase array scanner, and U.S. Pat. No. 9,366,938 to Anderson teaches an electro-optic beam deflector device. NMBS may allow scan rates, or beam cross-sections, exceeding those of mechanical scanners.

A photo-detector array should preferably consist of high-sensitivity detectors, as the number of photons arriving to each detector, especially from longer ranges, might be exceedingly small. Significant progress has been recently achieved in design and manufacturing of Avalanche Photo Diodes (APD), working in both a linear, and a Geiger mode, which is also known as a Single-Photon Avalanche Detector (SPAD). The former are reported to be able to detect a light pulse consisting of just a few photons, while the latter can actually be triggered by a single photon, and both types would be suitable for embodiments of the present invention. It should be noted, however, that the most advanced detectors are expensive to fabricate, therefore, the present invention that needs only one row of detectors would be very cost-efficient in comparison with flash LADAR, that would typically require a 2D array of the same resolution.

One of the problems typically encountered in ground-based and vehicular LADARs intended to be used in a populated area is the eye safety hazard presented by its powerful lasers. Therefore, a preferable embodiment of this invention would use a laser with longer infra-red (IR) wavelength, exceeding approximately 1400 nm. Such longer wavelengths are not well-absorbed by human eyes and therefore don't pose much danger. Respectively, much more powerful lasers might be used in this spectral range.

Figure 2A:
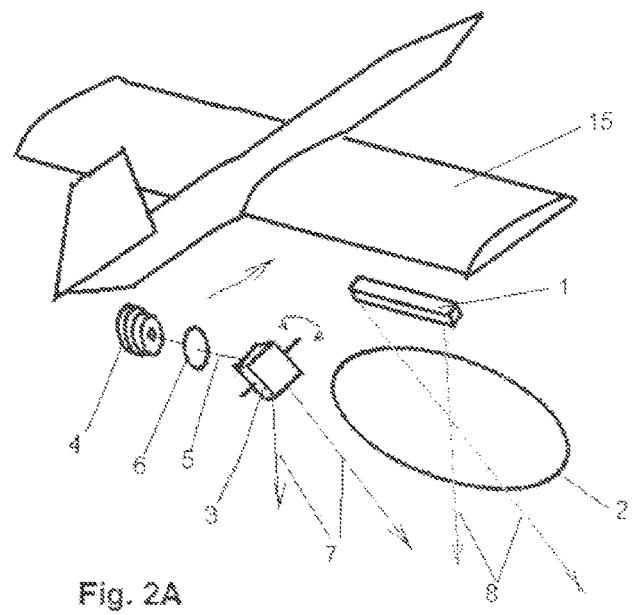
FIG. 2A illustrates a 1D hybrid LADAR installed on a Unmanned Aerial Vehicle (UAV) to obtain 2D ToF data.

Depending on a particular task the hybrid LADAR is optimized for, one of the following configurations of the slow stage may be used for ground surveillance, vehicular navigation and collision avoidance, control of industrial robots, other applications, or alternatively there may not be any slow stage at all. As depicted on FIG. 2A, the hybrid 1D LADAR of FIG. 1 is attached to an aerial platform 15, with the scan direction perpendicular to direction of platform motion.

Figure 2C:
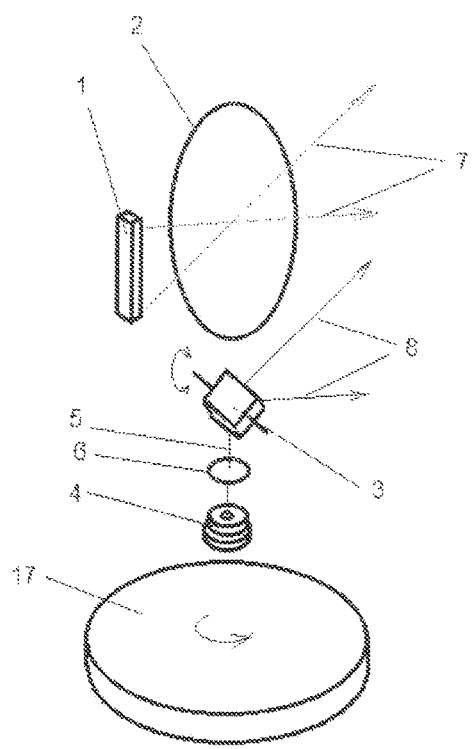
FIG. 2C illustrates a 1D hybrid LADAR installed on a rotating platform to obtain 2D ToF data.
Figure 2B:
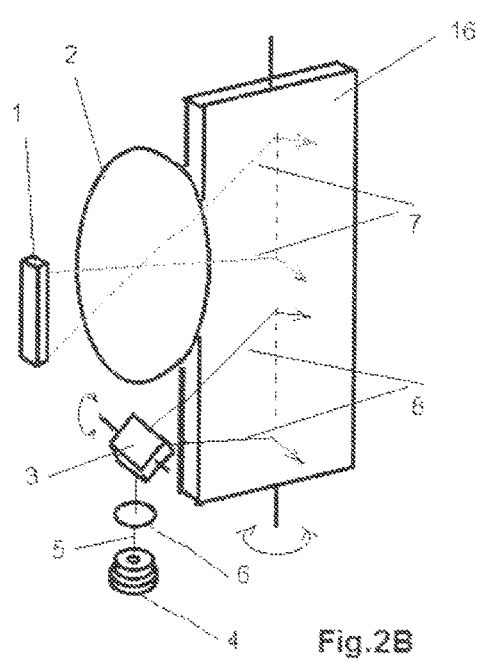
FIG. 2B illustrates a 1D hybrid LADAR coupled to an additional scanning mirror to obtain 2D ToF data.

FIG. 2B illustrates using a scanning mirror 16, with its scanning direction being perpendicular to the scanning direction of the hybrid. Combined, they constitute a 2D LADAR preferably having comparable scan angles in both directions. Finally, FIG. 2C illustrates positioning the hybrid of FIG. 1 on a rotational stage 17, which gives the combined LADAR a 360 degree FOV in a horizontal plane.

If a scanning mirror is used for the slow stage, its area should be sufficiently large to reflect the entire fan of beams emanating from the fast scanner, as well as the entire fan of rays coming to the optical reception system. However, scanning mirrors with active area of square centimeters, frequencies of tens of Hz, and scan angles of tens of degrees are commercially available. Thus, an exemplary combination of a detector array with 300 pixels, a fast scanner of 30 kHz, and a slow scanner of 30 Hz would provide a point cloud of ~18M points a second, assuming that both scanners utilize both scan directions, thus enabling real-time 3D vision with the resolution of approximately 1000×300 pixels at 60 frames a second. Rotation at 60 revolutions per second, or linear motion on board a vehicle would also provide comparable point acquisition rates, without the limitations of the reflective area of the scanning mirror.

Preferably, the optical system 2 is configured to form the FOV of each individual pixel 11 of the detector array to match the divergence angle of the laser beam, which is generally possible and usually not difficult to achieve. In an exemplary embodiment, a laser beam of near-infrared (NIR) light of approximately 1 mm in diameter will have a far-field divergence of approximately 1 milliradian (mrad). A photodetector pixel 20 um in size will have similar FOV when placed in a focal plane of a lens with 20 mm focal length.

It might also be advantageous to use additional elements in an optical transmission system to shape the laser beam, such as, for example, a cylindrical lens 23, as depicted in FIG. 3A. In this case, the laser may still be nearly-collimated in the scanning direction, but may be tightly focused in the orthogonal direction, as illustrated by FIG. 3B, which shows the view from direction B in FIG. 3A. Cylindrical lens 23 subsequently re-collimates the beam in the orthogonal direction as illustrated on FIG. 3C, which shows the view from direction C in FIG. 3A. The advantage of such an arrangement lies in the possibility to reduce the dimension of the scanning mirror in the tightly-focused laser beam direction, as well as in reduced eye hazard presented by the laser beam expanded in at least one direction.

Figure 4:
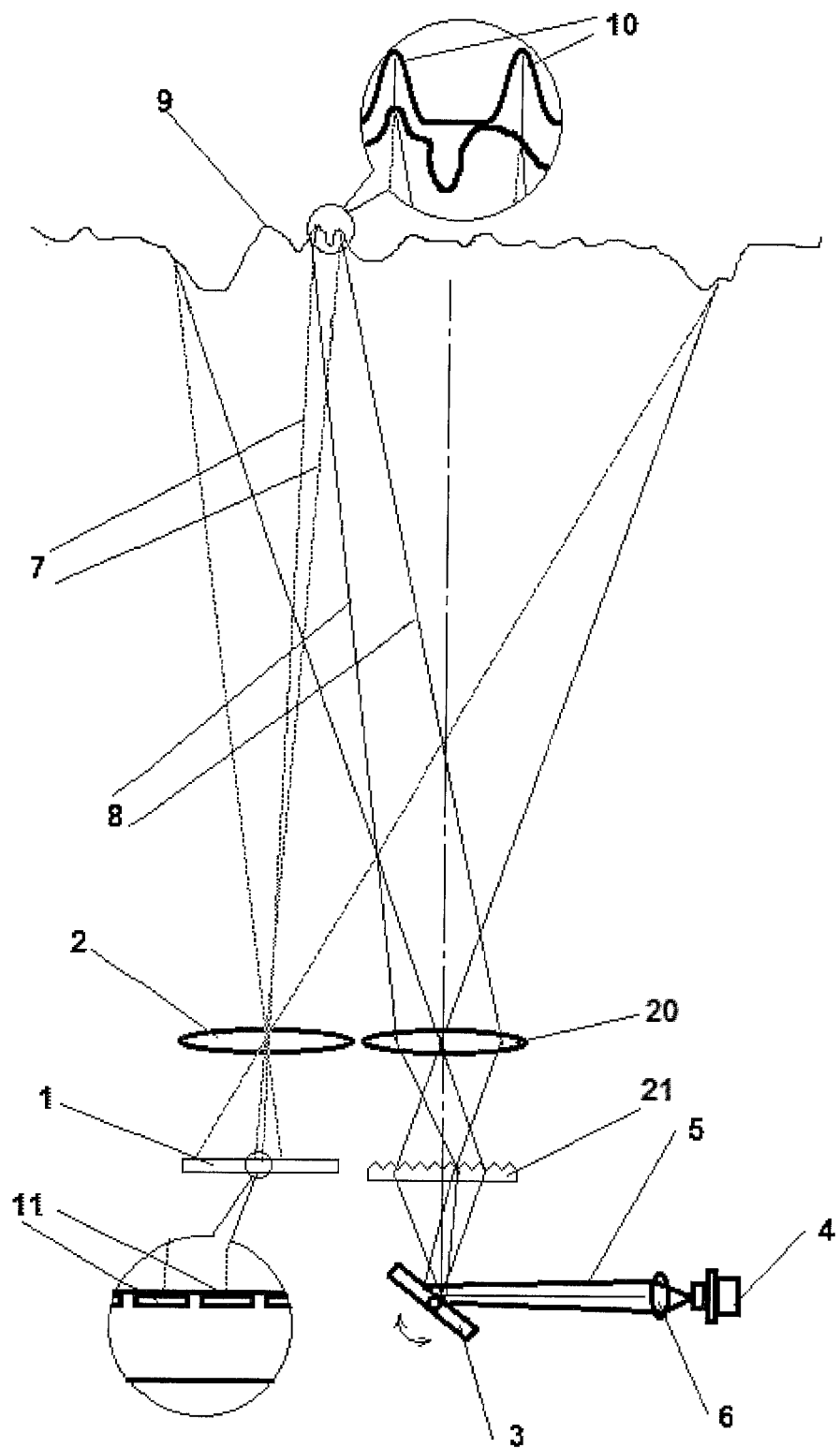
FIG. 4 illustrates forming a scan line on the surface of a diffractive element and imaging the scan line onto the target.
Figure 5A:
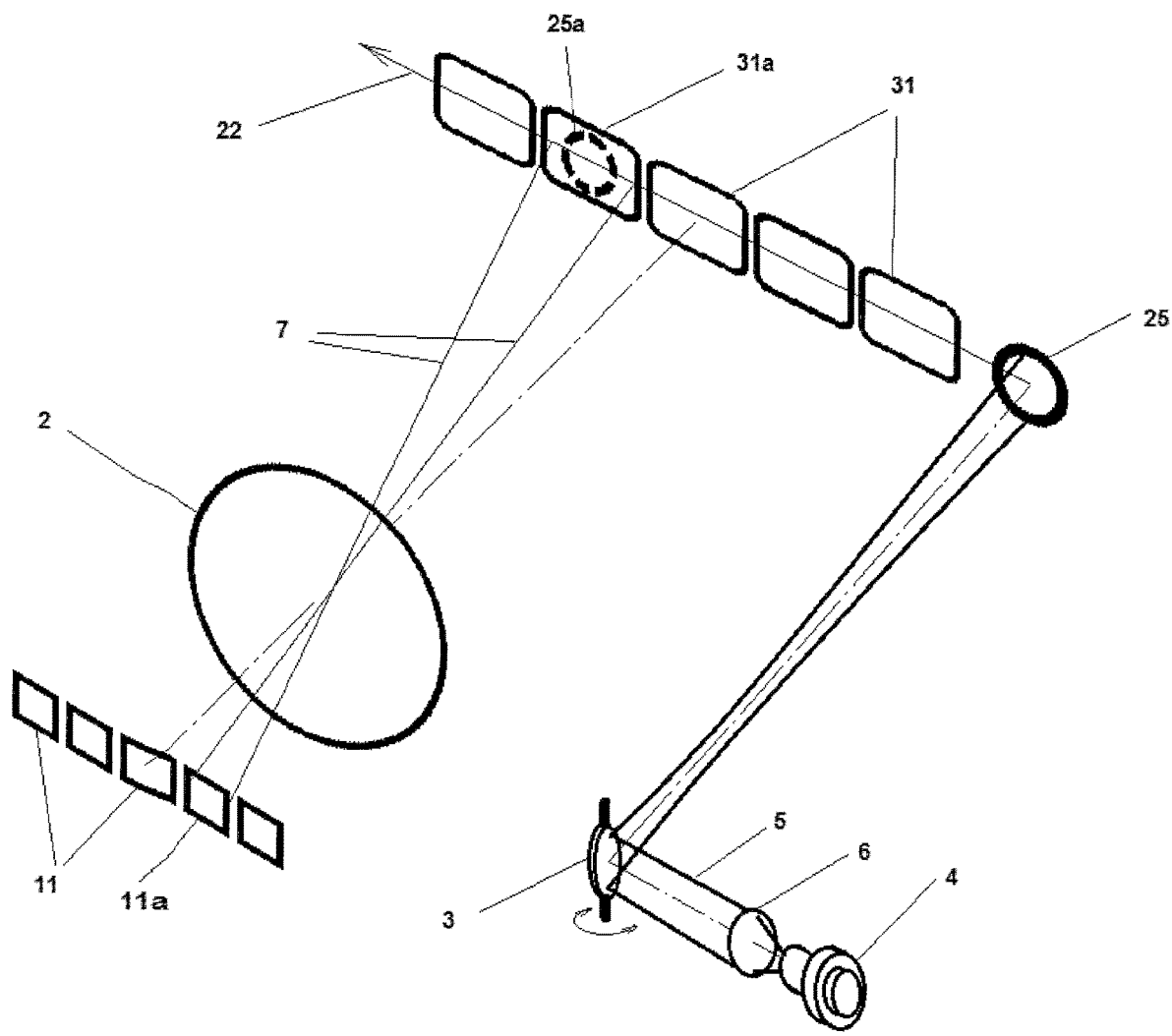
FIG. 5A illustrates a laser spot scanning across virtual detector pixels on the target.

In another embodiment of the present invention, the laser beam can be tightly focused in both directions and be scanned across a diffractive element 21, as illustrated on FIG. 4, forming a thin scan line on its surface. That scan line is subsequently imaged onto the target by the lens 20. The lens 20 may be identical to the lens 2 in the optical reception system in front of the detector array, in which case the dimensions of the scan line on the surface of a diffractive element 21 should be similar to that of the detector array, thus insuring the equal divergence of both FOVs of the illuminating laser and the detector. Alternatively, the lenses 2 and 20 may have different magnification, and respectively, the scan line may have different dimensions from the detector array, however, the design should provide for a good overlap of both FOVs on the target, as further illustrated on FIG. 5A, where virtual pixels 31 denote the projections of the detector pixels 11 onto the target through the optical system 2, while the laser spot 25 scans the same target along the scan line 22, thus sequentially illuminating pixels 11 with light reflected from the target. As shown on the figure for clarity, at the moment when the laser spot assumes position 25a, it illuminates the detector pixel 11a. It should be noted that the desired shape of laser spot 25 may be achieved by a variety of optical methods, as illustrated on FIG. 3 and FIG. 4, or other methods, without limiting the scope of this invention.

Figure 5B:
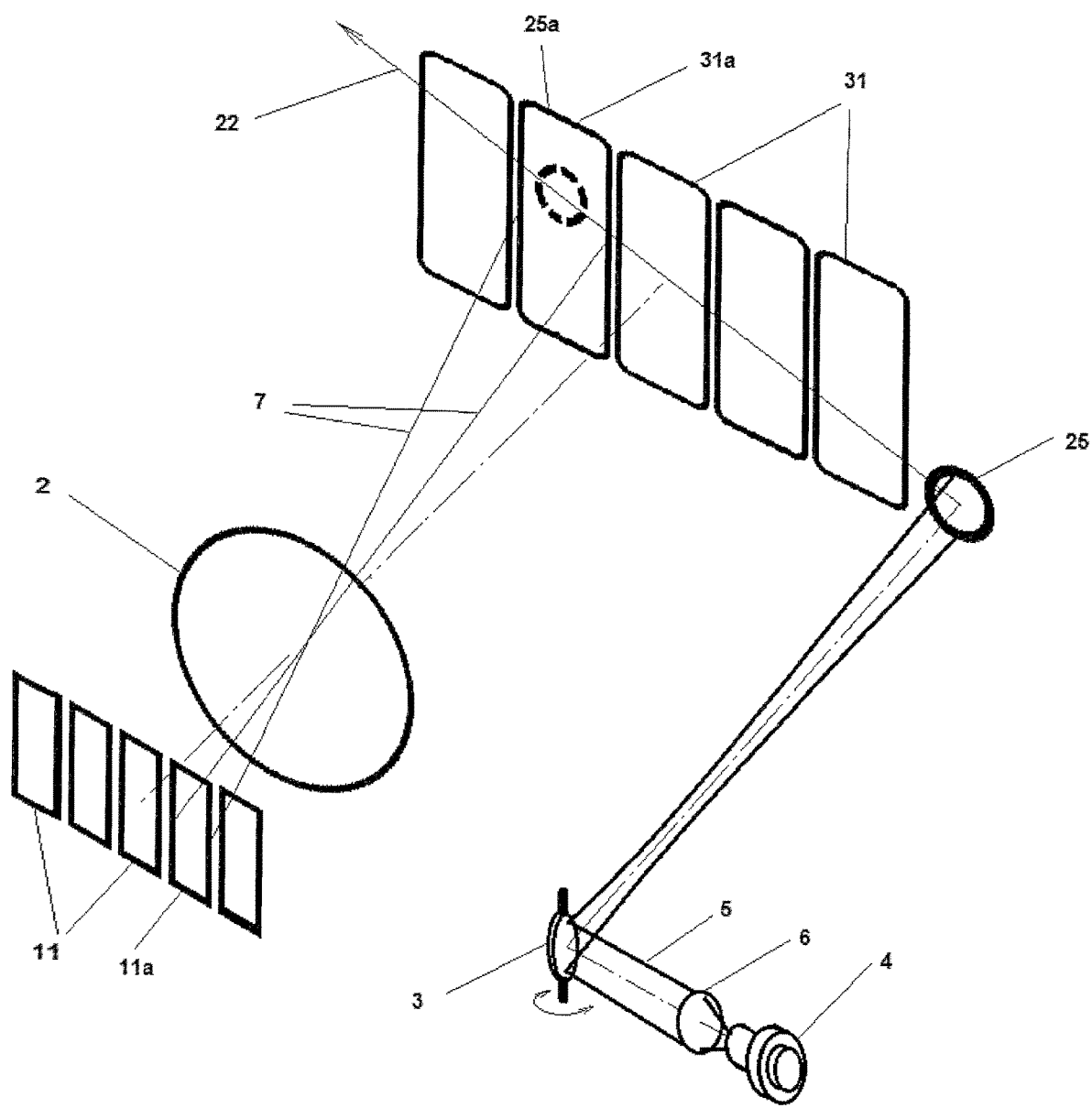
FIG. 5B illustrates permissible misalignment while the laser spot is scanning across tall virtual detector pixels on the target.
Figure 5C:
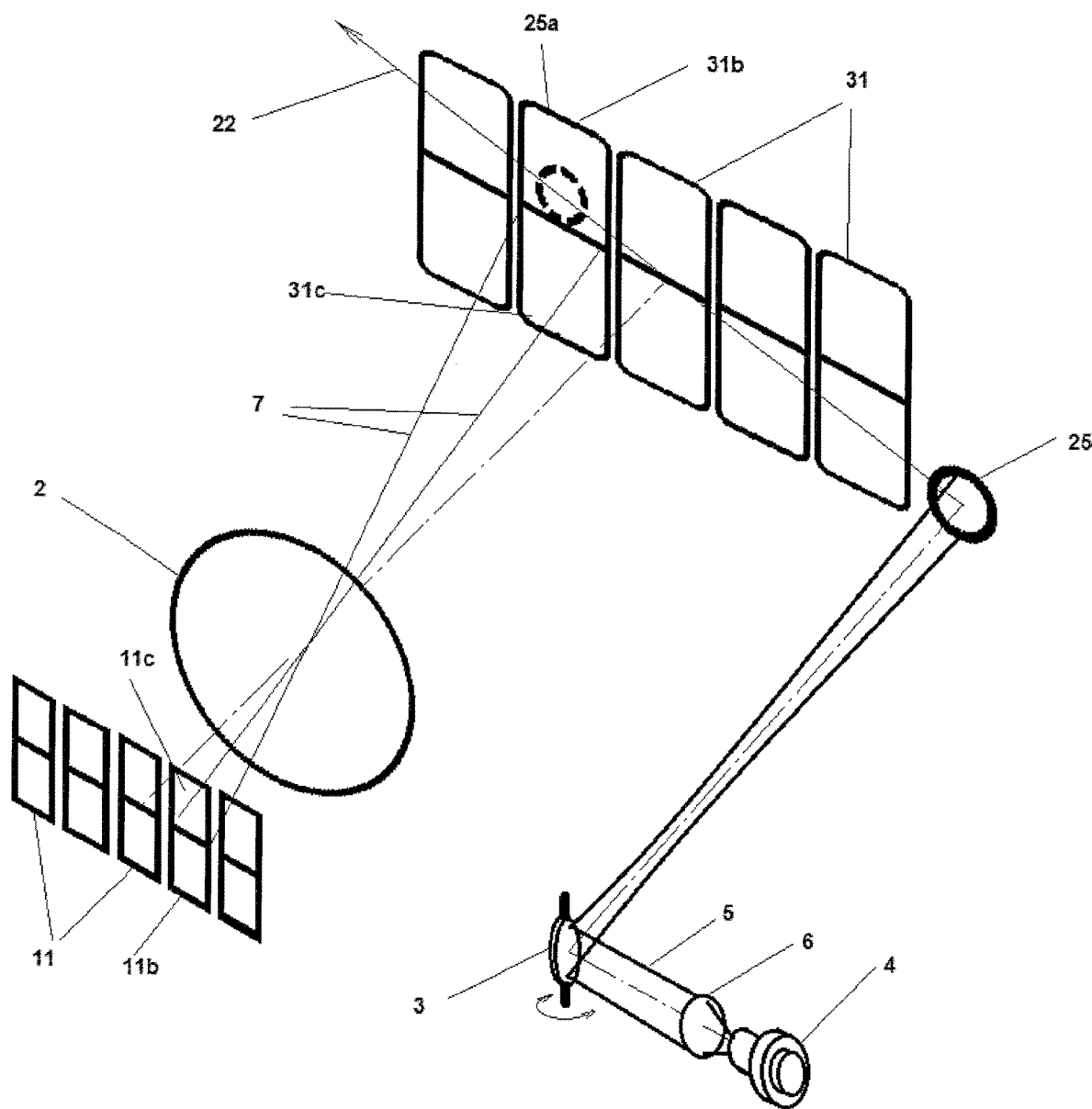
FIG. 5C illustrates splitting each of the pixels shown in FIG. 5B into two sub-pixels.

Pixels 11 may have different shapes: for example, FIG. 5B illustrates pixels with their height exceeding the pitch of the array. For example, pixels of the array may be 20 micrometers wide and 60 micrometers toll. The advantage of such arrangement is that it may accommodate slight misalignment between the laser scan line 22 and the line of virtual pixels 31. Likewise, the laser spot may also be oblong, or have some other desirable shape. It might also be advantageous to split each of the pixels 11 into two or more sub-pixels 11b, 11c, as depicted on FIG. 5C. These sub-pixels would generate redundant information, as the scan spot 25 may cross either of virtual pixels 31b, or 31c, or both of them, at the same time, and the ToA measured by either sub-pixels or both would be treated as one data point. The advantage, however, may come from the fact that smaller sub-pixels would generally have lower noise level, therefore a laser spot of the same power is more likely to generate a response when illuminating a small sub-pixel, than a larger full pixel.

Figure 5D:
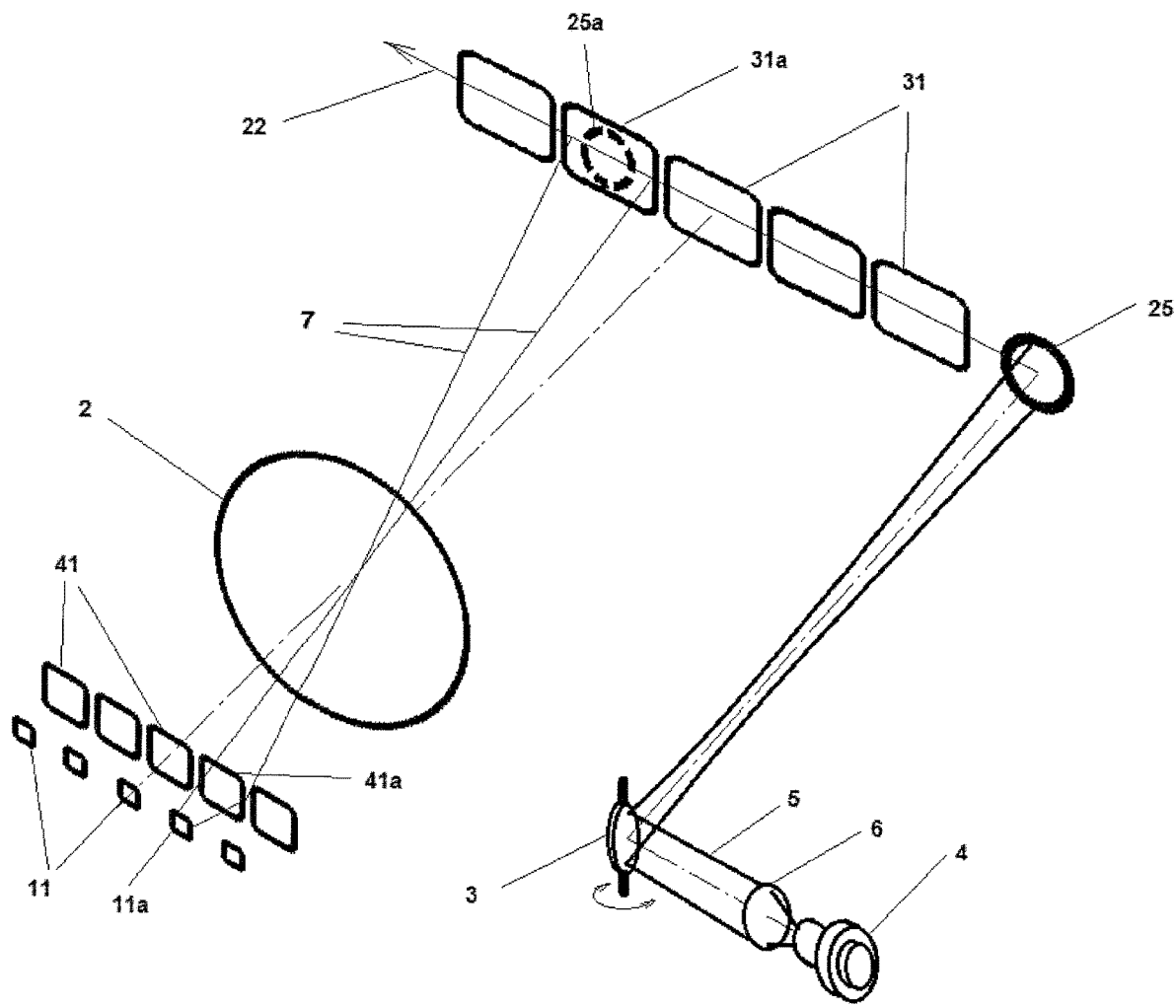
FIG. 5D illustrates positioning an array of micro-lenses in front of the detectors, and further illustrates how a relatively small pixel can be collecting light from a relatively large virtual pixel.

Some types of the high-sensitivity detectors, notably Geiger-mode APDs, are known to need considerable gaps between active pixels to eliminate cross-talk, thus limiting the fill factor of the arrays consisting of such detectors. To alleviate this problem, an array of micro-lenses 12 may be used in front of the detectors 11, as depicted on FIG. 5D, with the micro-lens 12a specifically illustrating how a relatively small pixel 11a can still be collecting light from a relatively large virtual pixel 31a.

It is also preferable to match the total extent of the array's FOV with the total scan angle, for example: 512 pixels, 20 um each, placed behind a 20-mm lens will subtend the angle of ~29°. Respectively, the total scan angle should be the same or slightly greater to utilize every pixel of the array.

Figure 6A:
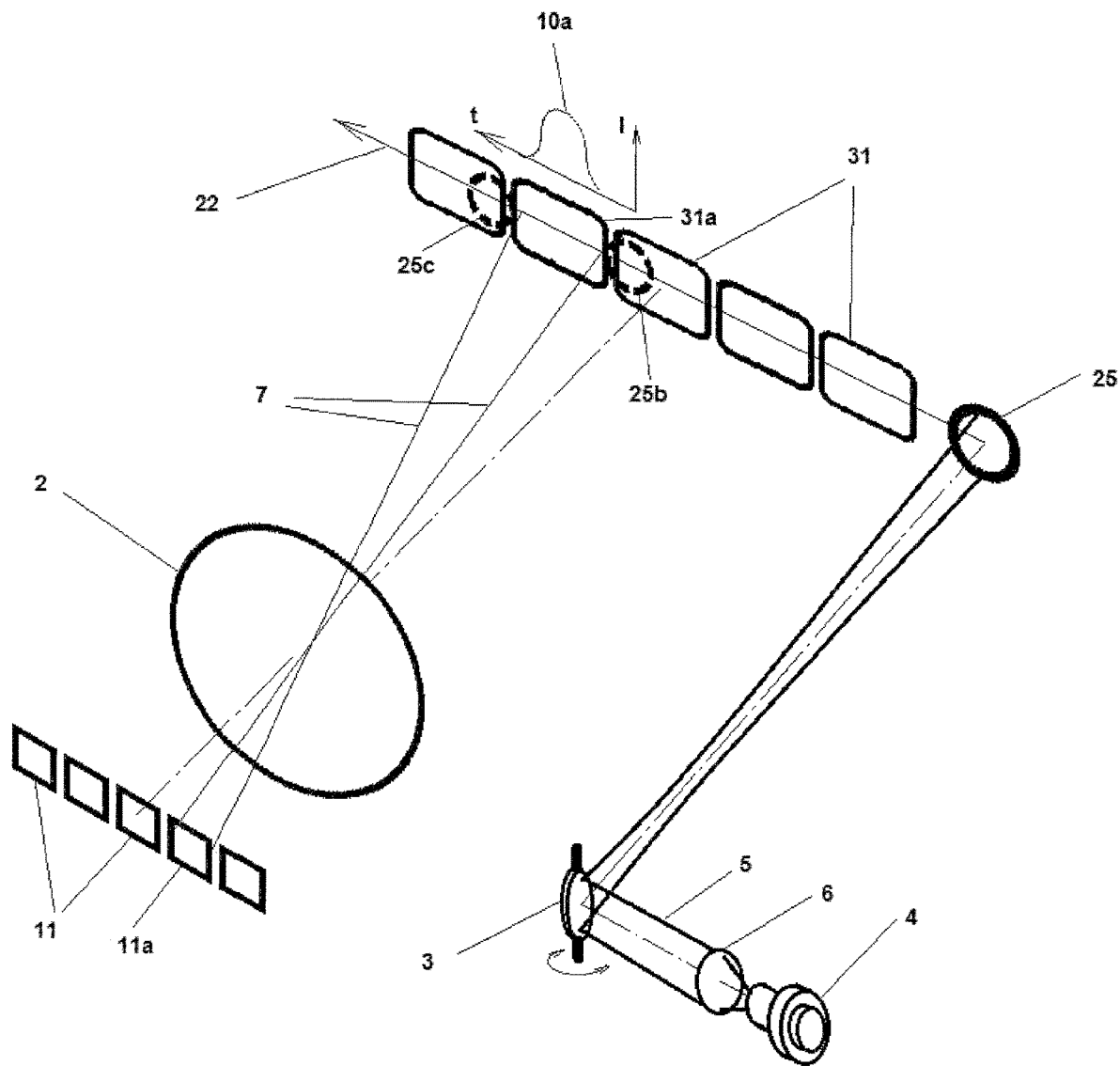

In a further embodiment of this invention, as the laser spot moves along the scan line, it is continuously energized, thus producing a time-domain response in the pixels it crosses, as illustrated on FIG. 6A, where the graph 10A represents the intensity (I) vs. time (t) response in the pixel 11a. The response starts when the laser beam in position 25b just touches the virtual pixel 31a, and ends when the laser beam moves to position 25c, just outside of the virtual pixel 31a. In such an embodiment, the laser power, and hence, the sensitivity is maximized, however, the precision of ToF measurement may suffer, due to the ambiguity of the Time of Arrival (ToA) of a relatively long light pulse.

Figure 6B:
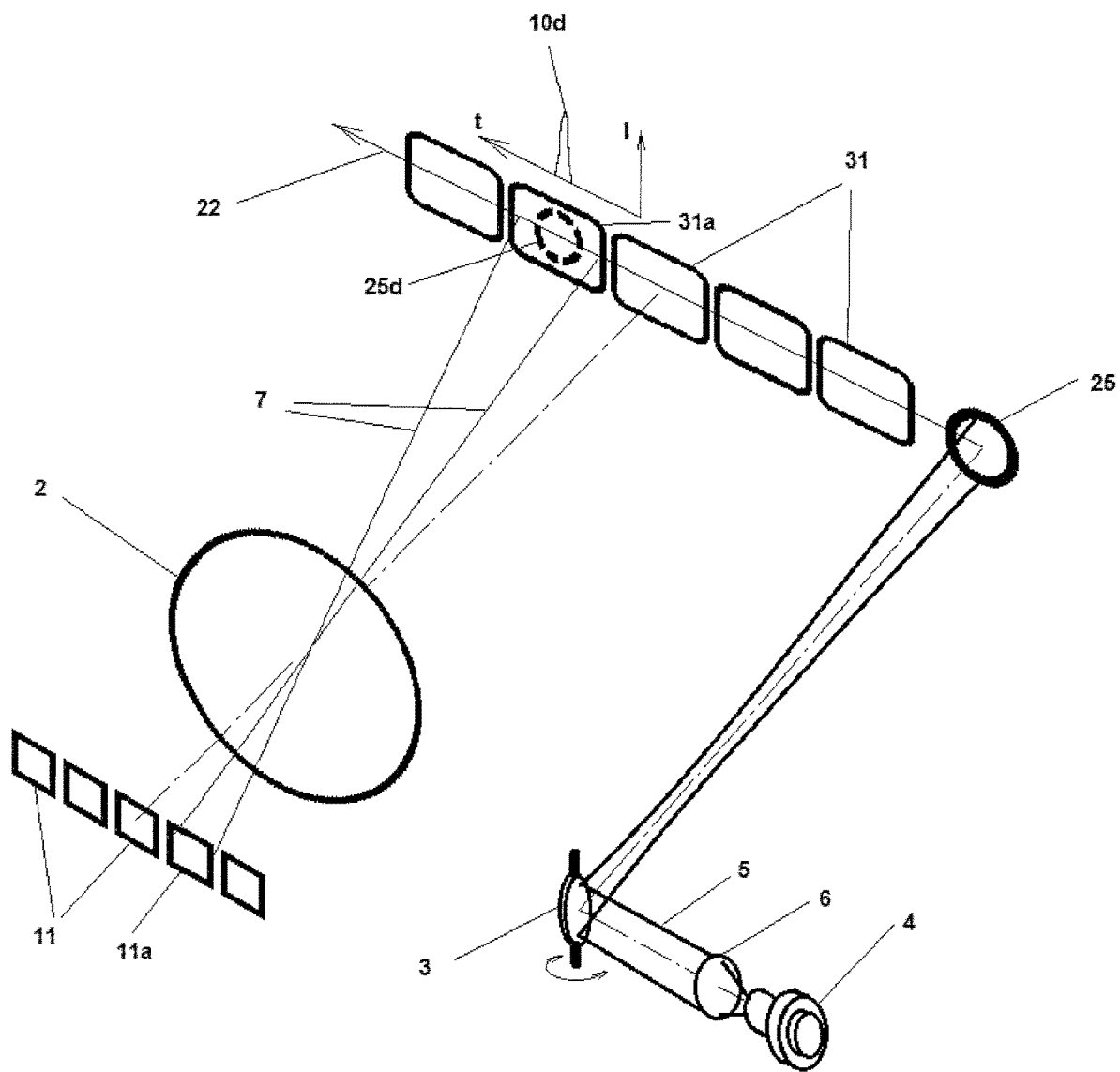
FIG. 6B illustrates the laser being modulated with one short pulse per pixel.
Figure 6C:
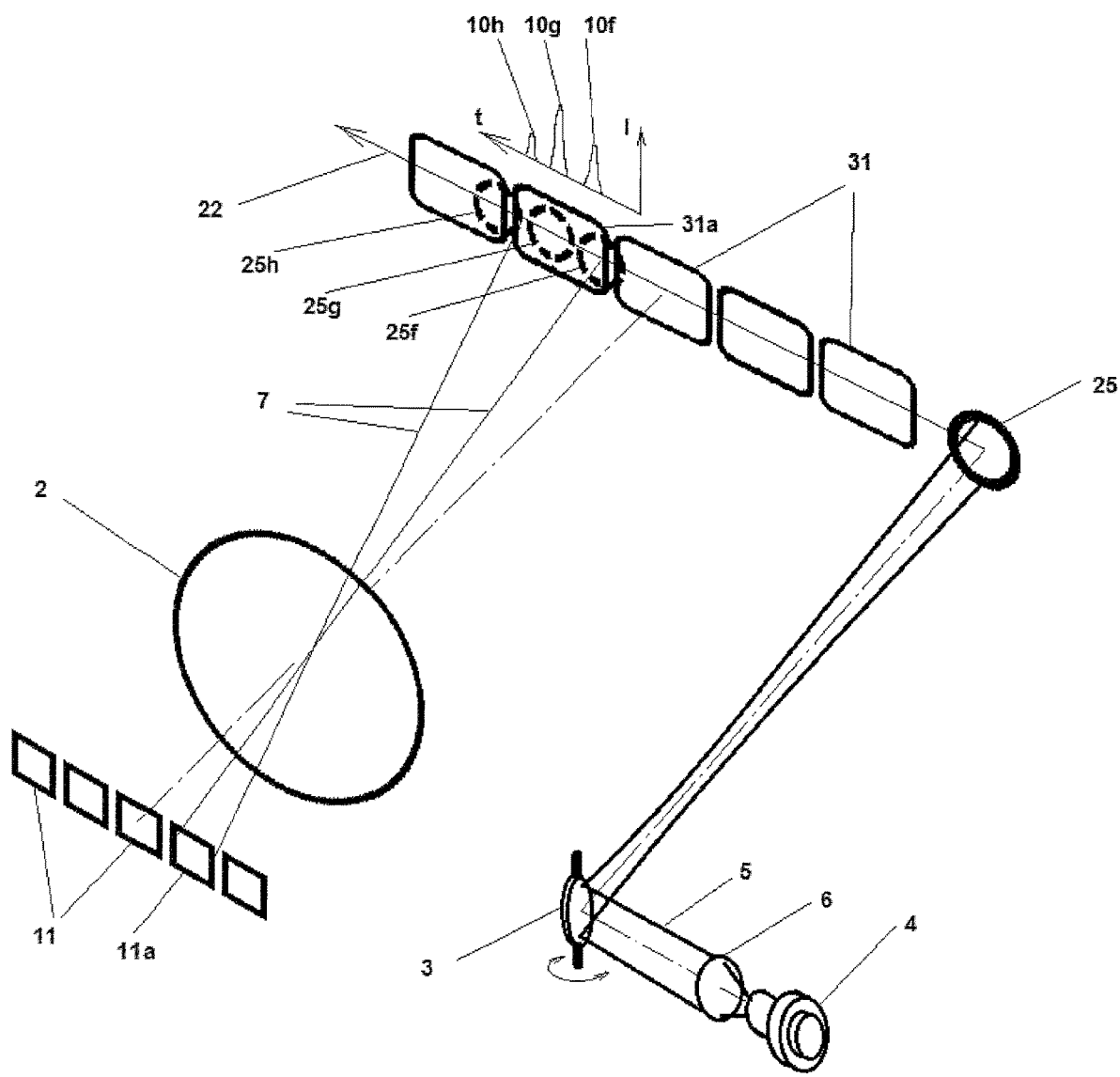
FIG. 6C illustrates the laser being modulated with multiple short pulses per pixel.

To alleviate this problem, the laser can be electrically-modulated with shorter pulses, as illustrated by FIG. 6B. For example, the laser is turned on when the laser spot is in the position 26d, producing the response 10d in the pixel 11a. Since the pulse is narrower, its ToA can be determined with greater precision.

One problem with this modulation method might arise if the laser is energized while its spot falls in between two virtual pixels, therefore each of the real pixels is getting only a fraction of the reflected light. Due to some parallax between the laser scanner and the detector array, the precise overlap between the laser spot and virtual pixels is somewhat dependent on the distance to the target, and hence not entirely predictable. To alleviate this problem, the laser may be modulated with more than one pulse per pixel, as illustrated on FIG. 6B. In this case, at least one of the consecutive modulation pulses emitted with the laser spot in positions 25f, 25g, 25h, would fully overlap with the virtual pixel 31a, thus producing full response 10g in the pixel 11a. Responses from two other pulses 10f and 10h might be shared with adjacent pixels and hence be lower.

Figure 7:
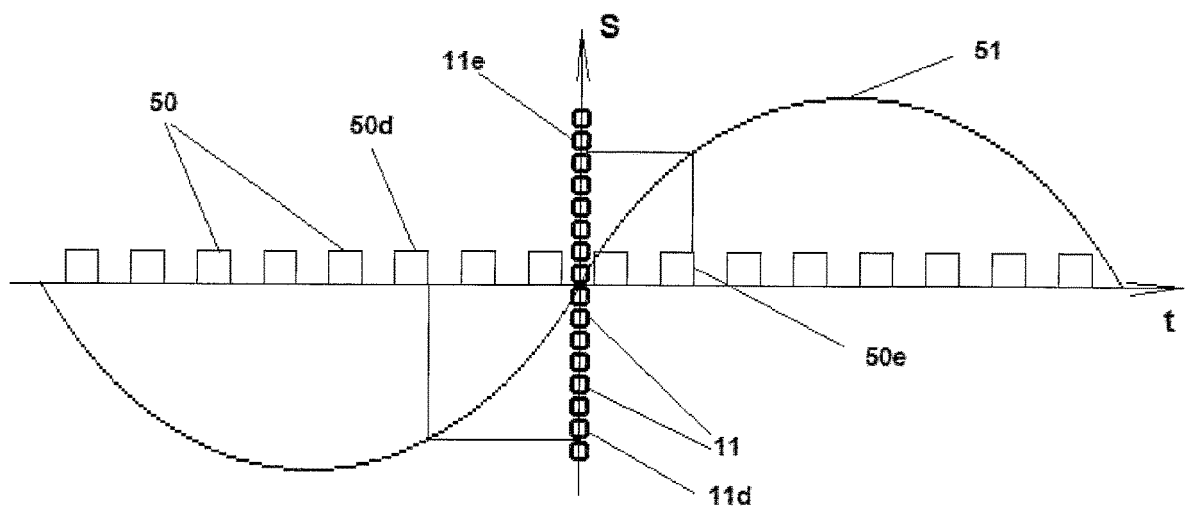
FIG. 7 illustrates synchronizing the clock of an electronic control system with the scanning process, so that there is a constant integer number of clock pulses per scanning cycle.

In any LIDAR system dependent on ToF measurements, it is important to accurately measure the ToA of a light pulse on the detector, as well as the time when the light pulse was emitted. In the present invention, additionally, it is important to precisely know the position of the scanned spot, as it determines which detector pixel will be illuminated. To achieve this, it is preferable to synchronize the clock of the electronic control system, denoted by pulses 50 on FIG. 7, with the scanning process, in such a way that there is a constant integer number of clock pulses per scanning cycle 51. The vertical axis (S) on FIG. 7 illustrates a scan angle, while the horizontal axis (t) illustrates time. Since many resonant scanners have unique, non-tunable resonant frequency, the system clock frequency may be changed instead to keep a integer number of clocks per period, preferably, by means of a Phase-Lock Loop (PLL) circuit. As long as this fixed relationship between the system clock and the scan angle is maintained, the system clock may be easily used for precise detector read-out timing, as well as for timing of the laser modulation pulses, if such modulation is used. Additionally, some types of detectors require quenching after they received a light pulse, and arming, to be able to receive the next pulse. Keeping pixels armed when they are not expected to be illuminated is undesirable, as it carries the risk of false positive due to internal noise. In most flash LADARs with such detectors, they are armed all at once, right before the illuminating laser pulse is emitted. In the present invention, it is preferable to arm detectors one-by-one, in the order they are illuminated by the scanning laser beam. As illustrated on FIG. 7, while the scanning beam proceeds from bottom to top, the pixel 11d would be armed by the system clock pulse 50d, while pixel 11e will be armed considerably later by the system clock pulse 50e.

Figure 8:
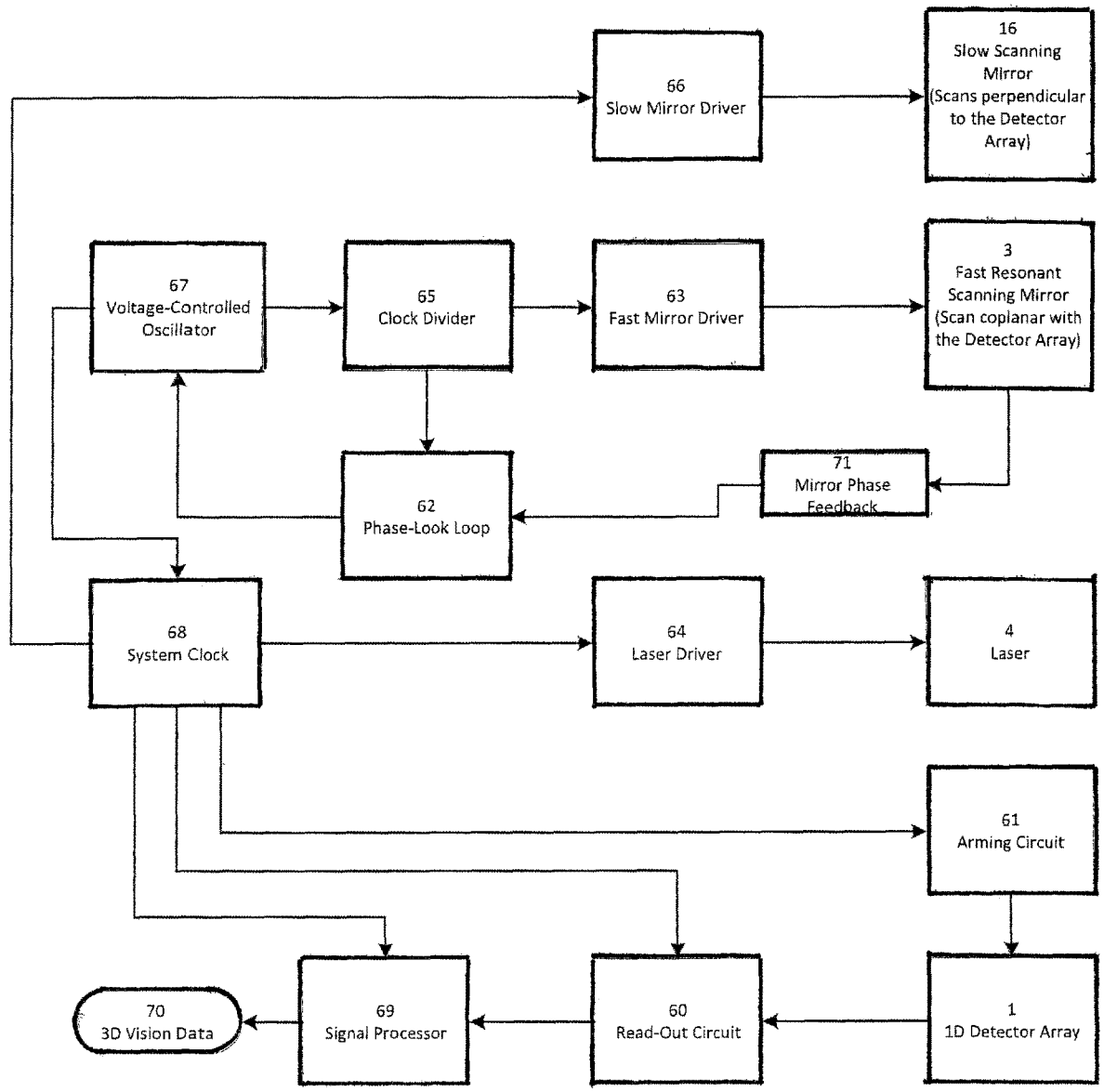
FIG. 8 illustrates the electronic control system of FIG. 7.

A preferred embodiment of the electronic control system is illustrated by FIG. 8. The fast scanning mirror 3 is driven by the driver 63 at the frequency defined by the voltage-controlled oscillator (VCO) 67 through clock divider 65. Being resonant, mirror 3 tends to oscillate at maximum amplitude while driven at its own resonant frequency and in a specific phase with respect to the drive signal. The mirror phase feedback 71 carries the information about the mirror's phase to the phase-locked loop (PLL) 62, that compares it to the phase of the clock divider and adjusts the VCO to eliminate any phase error, thus maintaining mirror oscillations close to its resonant frequency.

System clock 68 is derived from the same VCO, thus insuring that all other timing blocks function in strict synchronization with the mirror motion. Specifically, the arming circuit 61 provides sequential pixel arming and the laser driver 64 generate laser pulses in specific relationship to the scanned laser spot, as discussed above. Likewise, the same system clock synchronizes the motion of the slow mirror 16 through the driver 66 in a fixed relationship with the motion of the fast mirror, for instance, one cycle of the slow mirror per 1024 cycles of the fast mirror. Read-out circuit 60 and signal processor 69 may use the same clock as well, although they, unlike other elements discussed above, don't have to be strictly synchronized with the mirror motion. They must, however, be fast enough to be able to read and process data from all pixels within one scan cycle of the fast mirror. 3D vision data 70 is generated based on the ToF measurement coming from the detector array 1 and then supplied to users, such as navigation system of autonomous vehicles or security surveillance system.

It should be noted that the present invention offers a considerable advantage in efficiency over other types of LADARs, especially flash LADARs, where short laser pulses are used to illuminate the entire scene at relatively long intervals. The advantage comes from the fact that in the present invention the laser is energized either continuously, or with a fairly high duty cycle: for example, a LADAR of the present invention using 10 ns pulses per pixel and generating 18M data points per second would have a duty cycle of approximately 35%. A flash LADAR using the same 10 ns pulses, and having the same frame rate of 60 fps, would have the laser duty cycle of only 0.00006%. Consequently, to generate the same average power and attain comparable range, the laser of that hypothetical flash LADAR would need instantaneous power almost 6 orders of magnitude greater. While pulsed lasers capable of producing very short powerful pulses do exist, they are known to have lower efficiency, larger size and higher cost than continuous lasers of the same average power. Aside from inability to deliver high average power, pulsed sources are typically less efficient, more complex, bulkier and costlier, than continuous or high-duty sources. The general physical explanation of lower efficiency is in the fact that the emitted power of photonic sources—lasers or LEDs—is typically proportional to the current, while parasitic losses on various ohmic resistances inside those sources are proportional to the square of the current.

Additionally, high-power pulsed laser sources are typically more dangerous in terms of eye safety.

It should be noted, that it is difficult (although not impossible) to place the scanner at the center of the optical system. At any other position, there will be some parallax between the FOVs of the optical transmission and the reception systems, hence the detailed mapping of the pixels onto a scan line will depend on the distance to the target. However, in a practical system such parallax can be kept to a minimum by placing the scanner in close proximity to the optical system.

The present invention as illustrated by the above-discussed embodiments, would provide serious advantages over other types of LADAR.

In a typical imaging LADAR, the light source emits a short pulse which illuminates all pixels at once. Respectively, each pixel receives only a small fraction of the total back-scattered signal. In the proposed hybrid, only one pixel receives all the back-scattered light emitted at a given moment. If we assumed that the illumination power is the same, then the signal strength on each pixel would be up by a factor comparable to the number of pixels, i.e. hundreds, if not thousands. In practice, pulsed sources generally have higher instantaneous power than continuous ones, but their average power is still considerably lower.

Conversely, in a typical scanning LADAR, at any given moment only a small portion of the photo-detector is receiving any signal, while the rest only generates noise and contributes to unwanted capacitance. The exception is so-called retro-reflective scanners, where a small detector FOV is directed through the same scanning system. However, this approach only works with large, slow scanners, where the mirrors are large enough to provide sufficient optical collection area for back-scattered light. Contrarily, high-speed scanners are usually tiny, just sufficient to fit the beam of the laser, and are usually of the order of 1 mm.

In either case, as illustrated above, a hybrid appears would have a considerable SNR advantage: higher signal than imaging-only, or lower noise than scanning-only device.

It is anticipated that a hybrid LADAR of the present invention will be able to use a regular laser diode as its illumination source—which is by far the cheapest and most efficient source among those suitable for LADARs.

Also, both cost and power consumption are roughly proportional to the total number of pixels fabricated by a given technology. So, substituting a 2D array by a 1D array is supposed to considerably reduce both cost and power consumption for the detector array, while the cost and power consumption of both fast and slow scan stages may be considerably lower, than that of the array of pixels or the illuminating laser.

I claim:

1. A laser radar (LADAR) comprising:
   a laser configured to emit a wavelength of light;
   an optical transmission system configured to shape the light emitted by said laser into a beam, and to scan said beam along sequential planes of transmission light paths toward a target, wherein each pixel of a plurality of pixels in each plane of transmission light paths is sequentially illuminated by said scanned beam of laser light;
   a 1-dimensional array of photo-detectors, each photo-detector of said 1-dimensional array of photodetectors being sensitive to said wavelength of light emitted by said laser;
   an optical reception system configured to collect said laser light reflected from the target along reception light paths within each sequential plane onto said photo-detectors of said array, and each photo-detector of said 1-dimensional array of photo-detectors configured to determine a time-of-arrival measurement for a respective one of said plurality of pixels illuminated by said scanned beam of light within each sequential plane;
   an electronic control system configured to synchronize said scan of said beam with a respective time-of-arrival measurement from each said photo-detector, and to analyze said time-of-arrival measurements;
   a system clock;
   wherein said transmission optical system comprises a mirror configured to produce said scan of said laser beam, where said mirror is a mechanical resonant mirror; and
   wherein said system clock is phase-locked to oscillations of said mechanical resonant mirror.

2. The LADAR of claim 1, where an angle of a field of view (FOV) of each of said photo-detectors in the array in the direction of the array is the same as a divergence angle of said plane of transmission light paths in the same direction.

3. The LADAR of claim 1, where an angle of a field of view (FOV) of each of said photo-detectors in the array in a direction perpendicular to the direction of the array is the same as a divergence angle of said plane of transmission light paths in the same direction.

4. The LADAR of claim 1, where an angle of a field of view (FOV) of each of said photo-detectors in the direction of the array is the same as a total scan angle of said transmission system.

5. The LADAR of claim 1, where the laser is continuously on while the transmission path of said scan of said beam intersects the reception paths from all the detectors in the array.

6. The LADAR of claim 1, wherein said LADAR is placed on an aerial platform moving in the direction perpendicular to said plane containing the light paths of said transmission system.

7. The LADAR of claim 1, with a scanning mirror positioned in an optical path of the scanned laser beam, with an axis of rotation parallel to said plane containing the light paths of said transmission system.

8. The LADAR of claim 1 mounted on a rotational stage with an axis of rotation being parallel to said plane containing the light paths of said transmission system.

9. The LADAR of claim 1 where the photodetectors are Avalanche Photo Diodes (APD).

10. The LADAR of claim 9 where the photodetectors are Geiger-mode Avalanche Photo Diodes (APD).

11. The LADAR of claim 1 wherein each of said photodetectors comprise a single photon avalanche detector with individual time counters configured to record a time of arrival of a first photon after a reset.

12. The LADAR of claim 1;
   wherein said system clock is synchronized, whereby a frequency of pulses of said system clock are related to a frequency of said scan of said beam; and
   wherein said synchronization of said system clock is configured to provide a constant integer number of said clock pulses per said scan of said mirror, to permit accurate determination of a position of a scanned spot to determine a pixel to be illuminated.

13. The LADAR of claim 1 where said optical transmission system comprises a non-mechanical beam scanner (NMBS) configured for said scan of said laser beam.

14. The LADAR of claim 1,
   wherein said optical transmission system comprises:
     an optical element; and
     a diffractive element, said diffractive element comprising a plurality of ridges; and
   wherein said optical transmission system is configured to form a scan line on a surface of said diffractive element, and for said scan line to be imaged onto the target through said optical element.

15. The LADAR of claim 1 wherein said optical system comprises: a mirror and a cylindrical lens; wherein said mirror is configured to produce said scan of said laser beam; and wherein said optical system is configured for the laser beam to be focused on the mirror in a direction parallel to a scan axis of the mirror, and to then be re-collimated by said cylindrical lens.

16. The LADAR of claim 1 where a height of each pixel exceeds a pitch of each pixel.

17. The LADAR of claim 1 wherein said optical reception system comprises: an array of micro-lenses, with one said micro-lens positioned in front of each of said photo-detectors.

18. The LADAR of claim 1 where a frequency of said scan exceeds 10 kHz.

19. The LADAR of claim 1 where a frequency of said scan exceeds 30 kHz.

20. The LADAR of claim 1 where each individual photo-detector is illuminated for no more than 60 nanoseconds during each scan.

21. The LADAR of claim 1 where each photo-detector is illuminated for no more than 20 nanoseconds during one scan.

22. The LADAR of claim 1 where the laser is a diode laser.

23. The LADAR of claim 1 where the laser emits eye-safe light with said wavelength exceeding 1400 nm.

24. The LADAR of claim 1 wherein every said reception light path intersects with at least one of said transmission light paths.

* * * * *